(12) United States Patent
Millefiorini et al.

(10) Patent No.: US 8,694,616 B2
(45) Date of Patent: Apr. 8, 2014

(54) SERVICE BROKER INTEGRATION LAYER FOR SUPPORTING TELECOMMUNICATION CLIENT SERVICE REQUESTS

(75) Inventors: Marco Millefiorini, Latina (IT);
Giuseppe Guerrisi, Lavinio (IT);
Alessandro Urbani, Rome (IT)

(73) Assignee: Accenture Global Services Limited, Dublin (IE)

( * ) Notice: Subject to any disclaimer, the term of this patent is extended or adjusted under 35 U.S.C. 154(b) by 2196 days.

(21) Appl. No.: 11/313,497

(22) Filed: Dec. 13, 2005

(65) Prior Publication Data
US 2007/0118648 A1    May 24, 2007

(30) Foreign Application Priority Data

Oct. 28, 2005  (EP) .................................... 05425764
Oct. 28, 2005  (IT) .............................. MI2005A2073

(51) Int. Cl.
*G06F 15/173* (2006.01)

(52) U.S. Cl.
USPC ......................................................... 709/223

(58) Field of Classification Search
USPC ......................................................... 709/223
See application file for complete search history.

(56) References Cited

U.S. PATENT DOCUMENTS

| | | | |
|---|---|---|---|
| 6,026,424 A * | 2/2000 | Circenis ........................ | 718/104 |
| 6,076,093 A | 6/2000 | Pickering | |
| 6,263,370 B1 * | 7/2001 | Kirchner et al. ............... | 709/230 |
| 6,449,341 B1 * | 9/2002 | Adams et al. ..................... | 379/9 |
| 6,453,356 B1 | 9/2002 | Sheard et al. | |
| 6,493,695 B1 * | 12/2002 | Pickering et al. ............... | 706/47 |
| 6,775,262 B1 | 8/2004 | Skog | |
| 6,910,074 B1 | 6/2005 | Amin et al. | |
| 7,140,025 B1 * | 11/2006 | Dillow et al. ................. | 719/313 |
| 7,552,323 B2 | 6/2009 | Shay | |
| 2002/0035617 A1 | 3/2002 | Lynch et al. | |
| 2003/0065777 A1 | 4/2003 | Mattila et al. | |
| 2004/0015366 A1 | 1/2004 | Wiseman et al. | |

(Continued)

FOREIGN PATENT DOCUMENTS

| | | |
|---|---|---|
| EP | 0980175 A2 | 6/2000 |
| EP | 1 052 841 A2 | 11/2000 |

(Continued)

OTHER PUBLICATIONS

Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.

(Continued)

*Primary Examiner* — Krista Zele
*Assistant Examiner* — Esther Benoit
(74) *Attorney, Agent, or Firm* — Brinks Gilson & Lione

(57) ABSTRACT

A telecommunications architecture processes telecommunications service requests received from third parties through a secure access gateway. The third parties may be other telecommunications service providers which employ the services to support their own products and services or may be or individual subscribers. The service broker provides a flexible and efficient layer in the telecommunications architecture for processing the service request. The service broker also overcomes the technical problems associated with third party service request processing. In addition to providing technical solutions for efficient and secure processing of service requests for exposed services, the architecture also provides an additional revenue channel for existing telecommunication service providers.

20 Claims, 20 Drawing Sheets

(56) References Cited

U.S. PATENT DOCUMENTS

| | | |
|---|---|---|
| 2004/0111506 A1 | 6/2004 | Kundu et al. |
| 2004/0133486 A1 | 7/2004 | Markki et al. |
| 2004/0139166 A1 | 7/2004 | Collison |
| 2004/0153404 A1 | 8/2004 | Rischmueller et al. |
| 2004/0249910 A1 | 12/2004 | Jerbi et al. |
| 2005/0091370 A1 | 4/2005 | Wietfeld |
| 2005/0149724 A1 | 7/2005 | Graff |
| 2005/0160135 A1 | 7/2005 | Yokoro |
| 2005/0165930 A1* | 7/2005 | Whitman, Jr. ............... 709/226 |
| 2005/0185661 A1 | 8/2005 | Scott et al. |
| 2005/0223064 A1* | 10/2005 | Salerno et al. ............... 709/206 |
| 2006/0101474 A1* | 5/2006 | Magown ...................... 719/315 |
| 2007/0050340 A1* | 3/2007 | von Kaenel et al. ............ 707/3 |
| 2007/0240046 A1* | 10/2007 | Yan et al. ..................... 715/700 |

FOREIGN PATENT DOCUMENTS

| | | |
|---|---|---|
| EP | 1 418 743 A1 | 5/2004 |
| JP | 2002-140309 A | 5/2002 |
| JP | 2003-060714 A | 2/2003 |
| JP | 2004-266310 A | 9/2004 |
| JP | 2005-202631 | 7/2005 |
| JP | 2006-504297 A | 2/2006 |
| JP | 2006-510328 A | 3/2006 |
| WO | WO 03/025809 A2 | 3/2003 |

OTHER PUBLICATIONS

Dr. Bert Dempsey and Dr. Matthew Lucas, "IPDR Update: Standards Effort Moves From Usage to Provisioning", pp. 44-48, TelOSSource Magazine, Apr. 2000.

Sun Microsystems, Chapter 8, Authentication Options, Sun Java System Access Manager 6 2005Q1 Adminstration Guide, Sun Microsystems, pp. 1-25, Mar. 2005.

Opencon, "White Paper on Billing for the New Public Network", pp. 1-5, OpenCon Systems, Inc., www.opencon.com, 2000.

The Parlay Group, Inc., The Parlay Goup: Web Services Working Group, "Parlay Web Services Application Deployment Infrastructure", pp. 1-21, Version 1.0, Oct. 31, 2002.

Michel L.F. Grech et al., "Delivering Searmless Services in Open Networks Using Intelligent Service Mediation", pp. 186-202, Bell Labs Technical Journal, Jul.-Sep. 2000.

Indian Examination Report, dated Sep. 29, 2008, Indian Patent App. No. 1722/MUM/2006.

EPO Examination Report, dated May 19, 2006, EP Pat. No. 05425821.5.

EPO Examination Report, dated May 10, 2006, EP Pat. No. 05425824.9.

Silver et al., "Unified Network Presence Management," White Paper Nortel Networks, 2000, 6 pages.

Anonymous, "3GPP; Technical Specification Group Services and Systems Aspects; Presence Service, Architecture and Functional Description," 3GPP TS 23.141 V6.0.0, Oct. 2002, 31 pages.

Livingston et al., "Remote Authentication Dial in User Service (RADIUS)," Radius Working Group, Internet-Draft, Feb. 2000, 80 pages.

Droms, "Dynamic Host Configuration Protocol," Oct. 2003, available from http://www.ietf.org/rfc1541.txt, 40 pages.

The prosecution history of U.S. Appl. No. 11/313,441.
The prosecution history of U.S. Appl. No. 11/313,463.
The prosecution history of U.S. Appl. No. 11/313,496.
The prosecution history of U.S. Appl. No. 11/314,576.
The prosecution history of U.S. Appl. No. 11/314,577.
Japanese Office Action, Dispatch Date Jan. 25, 2010, 3 pgs.
English translation of Japanese Office Action, Dispatch Date Jan. 25, 2010, 2 pgs.

* cited by examiner

| Traffic Control Parameters | 234 |
|---|---|
| Functionality Name: Activation | 402 |
| Pool Size: 10 | 404 |
| Polling Timer: 100ms | 406 |
| Submit Timer: 100ms | 408 |
| Criteria: Pool Only | 410 |
| Standby: On | 412 |
| Wait: Continue | 414 |
| Control Locked: True | 416 |
| Data: | 418 |

Figure 4

SERVICE BROKER INTEGRATION LAYER FOR SUPPORTING TELECOMMUNICATION CLIENT SERVICE REQUESTS

PRIORITY CLAIM

This application claims the priority benefit of EPO Application No. 05425764.7 filed Oct. 28, 2005, and Italian Application No. MI2005A002073 filed Oct. 28, 2005, both of which are incorporated herein by reference in their entirety.

BACKGROUND OF THE INVENTION

1. Technical Field

This invention relates to telecommunications processing system architectures. In particular, this invention relates to a layer in a telecommunications system architecture which processes third party telecommunication service requests.

2. Related Art

Rapid advances in data processing and telecommunications technology have lead to a vast array of communication services available to the consumer. Such telecommunications services include traditional telephone service, Internet service, cable television service, cellular phone service, paging service, combined voice and data delivery service, and many other services. Furthermore, many services may be either wireless or wireline based.

Established telecommunications service providers have invested enormous amounts of time, money, and advanced technology to implement and reliably provide a broad spectrum of telecommunication products and services. In the past, this investment has been of primary benefit only to the telecommunications service provider. That is, the telecommunications service providers internally maintained their own technologies in confidence and for their own use.

Against this backdrop of sophisticated telecommunications architectures is the desire within each telecommunications service provider to explore and develop new business opportunities which lead to new revenue channels. Existing technology in the service provider architectures could drive such new revenue channels. However, in the past there was no sufficiently secure, flexible, and efficient mechanism which allowed third parties to access underlying functionality in service provider architectures.

Furthermore, even if the third parties could access the functionality in the service provider architecture, there was no supporting architecture for handling the third party service requests. It is not enough that a third party may request telecommunications service from a service provider. Without a supporting processing architecture, the third party requests are unanswered.

A need has long existed for enhanced telecommunications service provider architectures.

SUMMARY

Establishing enhanced telecommunications service provider architectures poses significant technical challenges. As one example, there is a technical challenge in receiving and organizing the very large number of potential simultaneous or nearly simultaneous service requests which may be received from third parties. As another example, there is a technical challenge in determining which service requests to process in an organized and efficient manner. Additional technical challenges exist in executing the extracted service requests to actually accomplish the requested processing, providing fault tolerant service request processing, and maximizing performance of service request processing.

One aspect of the invention is a service broker layer which provides a service request processing system for a telecommunications architecture. The service request processing system includes a service request interface, a dispatcher system, a fetcher system, and a workflow engine. Additional or different components may be included in the service request processing system.

The service broker is part of a service delivery platform and provides several technical advantages. The first advantage is configurability, achieved through the technical order management database definition of workflows, tasks, and actions. The service broker allows a telecommunications service provider to create new services starting from existing building blocks and allows the service provider to create new building blocks from predefined templates. The service broker thereby provides the service provider with extensive flexibility in defining services without restricting the service provider to a complete custom and inflexible infrastructure.

A second advantage is control. The service broker provides error handling, logging, and control over workflows (particularly asynchronous workflows) which execute to deliver the services. The service broker provides an error management graphical user interface. Through the interface, an experienced operator may complete, resubmit, change, rework, or otherwise correct the processing of a workflow which delivers a service.

The third advantage is maintenance. In general, the service broker avoids hard coding of workflows, messages, and data elements. Instead, the service broker uses reconfigurable XML and metadata based workflows, messages, and data elements. As a result, the service broker functionalities are far easier to maintain, revise, extent, and improve compared to a hardcoded implementation.

Furthermore, the service broker provides the capability to execute both synchronous and asynchronous workflows. Enhanced performance results. In some implementations, 500 transactions or more per second may be processed.

The service request interface receives service requests for telecommunications services from external entities. Each service request includes a service identifier field. The service identifier field informs the service broker of the type of service requested in the service request.

The dispatcher in the service broker receives each service request. Based on the service identifier fields, the dispatcher distributes the service requests into different service queues. Individual service queues may be established to independently queue requests for specific requesting entities and/or types of service. As examples, the service queues may include a message delivery (e.g., SMS or MMS) service request queue, a charge service request queue, a service activation request queue, or other types of service queues.

The service broker also includes a fetcher system. The fetcher system retrieves the queued service requests from the individual service queues for processing. In some implementations, the service broker may include multiple fetcher systems which provide multiple independent fetcher engines. A set of traffic control parameters govern retrieval of the queued service requests from the individual service queues by the fetcher system.

Workflow engines initiate sequences of workflow steps which fulfill the retrieved service requests. The service broker may execute multiple independent workflow engines. The workflow engines may process workflows defined for service requests selected by a specific fetcher system, for example.

Additional aspects of the invention include methods and systems for efficiently sequencing telecommunication service request processing. In particular, the service broker establishes multiple service queues and distributes multiple queued telecommunication service request records into the service queues. The service broker also initiates simultaneous execution of multiple fetcher engines to retrieve the service requests.

A first fetcher engine then retrieves part of a telecommunication service request record (e.g., a Technical Service Order Identifier (TSO_ID)) stored in the service queues. The service request record represents a first service request submitted by an external entity. Similarly, a second fetcher engine retries a part of another telecommunication service request stored in the service queues. The service request record represents a second service request submitted by an external entity.

The service broker then employs different workflow request delivery techniques for initiating workflow execution to implement the first service request and the second service request. For example, the service broker may implement the first workflow request by publishing a workflow request message through a message publication/subscription system to which a workflow engine has subscribed. As an alternate workflow request delivery technique, the service broker may directly call a second workflow engine, specifying the second service request.

The service broker architecture thereby overcomes the technical challenges associated with processing external service requests. The distribution of service requests in queues addresses the technical challenge of receiving and organizing an enormous number of simultaneous or nearly simultaneous service requests. The multiple fetcher and workflow engine architecture address the technical challenge in extracting the service requests in an organized and efficient manner, executing the extracted service requests to actually accomplish the requested processing, providing fault tolerant service request processing, and maximizing performance of service request processing.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 4 illustrates traffic control parameters for a fetcher system in a service broker.

DETAILED DESCRIPTION OF THE PREFERRED EMBODIMENTS

Figure 1:
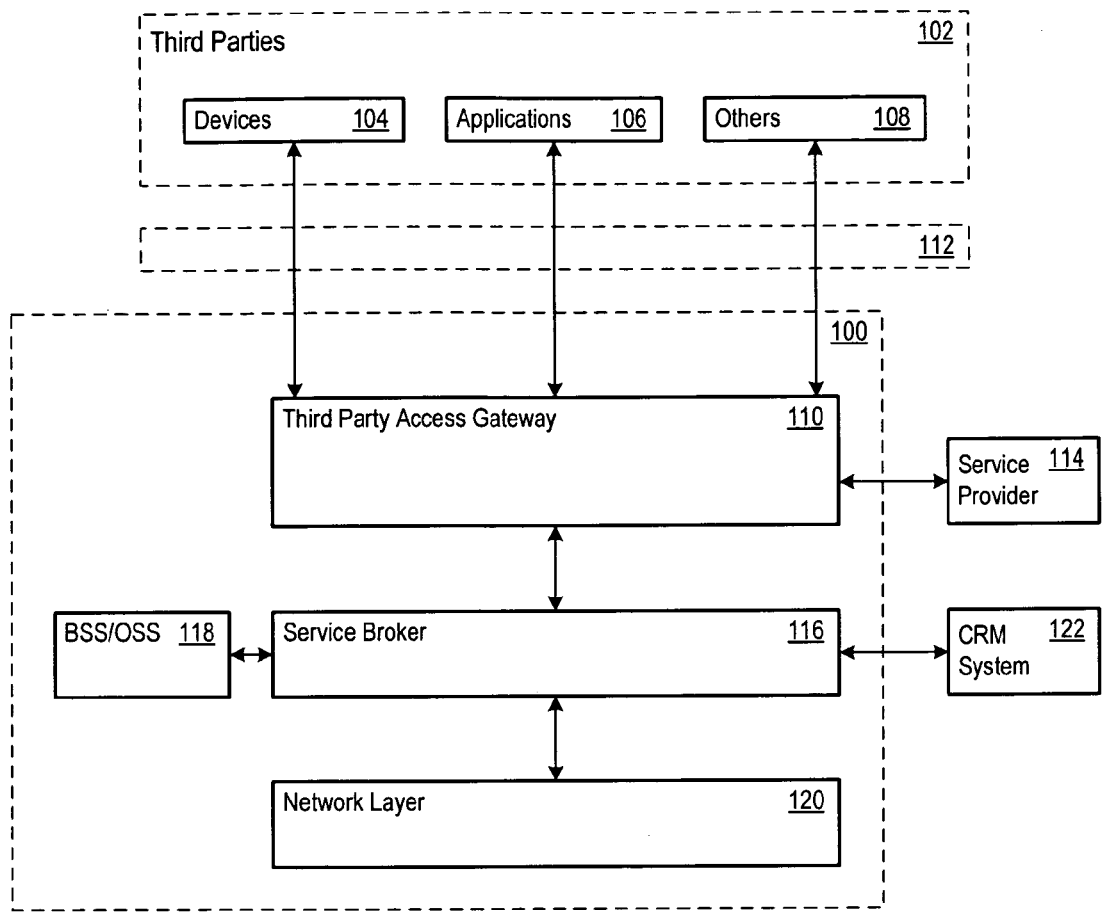
FIG. 1 shows a portion of a telecommunications architecture which includes a service broker connected to a third party access gateway.

FIG. 1 shows a telecommunications architecture 100 which interacts with third parties 102. The third parties 102 may vary widely in form and in implementation. As examples, the third parties 102 may include: subscriber devices 104 such as cellular phones, personal data assistants, network (e.g., Internet) communication devices; applications 106 such as telecommunications service applications implemented by other service providers, such as Short Message Service (SMS) messaging applications, Session Initiation Protocol (SIP) systems, and billing applications which charge customers for products and services; and other devices, programs, or entities 108.

The telecommunications architecture 100 implements functionalities which support telecommunications products and services. The telecommunications architecture 100 exposes selected functionalities to the third parties 102. In other words, the third parties 102 may communicate with the telecommunications architecture 100 to use the functionalities already in place in the architecture 100. As a result, the third parties 102 need not expend the resources required to locally duplicate the functionalities already provided by the telecommunications architecture 100.

The products and services, and their exposed underlying functionalities, may vary between implementations. As examples, the telecommunications architecture 100 may expose SMS messaging services (to deliver and charge for an SMS message), Multimedia Messaging System (MMS) messaging services (to deliver and charge for an MMS message), and SIP services (to setup a SIP call and charge for the call). As additional examples, the telecommunications architecture 100 may expose Charge services (to request to bill a charge against an account), Internet Protocol Television (IPTV) services (to request delivery of television programming), User Status services (to request a current user status, such as 'online', 'offline', 'busy', or 'away'), and user authentication services (e.g., to request verification of whether a mobile user exists and whether the mobile user has the credentials to purchase a desired service, such as IPTV service). Other functionalities may be provided in addition or as alternatives. Furthermore, the telecommunications architecture 100 may also provide access to communication network services (e.g., Internet browsing services) through the third party access gateway 110.

The telecommunications architecture 100 secures access to the exposed services. To that end, the architecture 100 provides a third party access gateway 110. The third party access gateway 110 acts as a single point of contact for the third parties 102 to the exposed services.

As shown in FIG. 1, the third party access gateway 110 receives service requests 112 from the third parties 102. In response, the third party access gateway 110 verifies that the service request originates with an authenticated and authorized third party. In the case of network communication service requests (as one example), the third party access gateway 110 processes authorized service requests and relays the service requests to service providers 114. In the case of exposed service requests, such as SMS, MMS, and SIP service requests, the third party access gateway 100 may process and relay the authorized service requests to the service broker 116.

The service broker 116 executes the service request. In doing so, the service broker 116 may communicate with Business Support Systems (BSS) and Operation Support Systems (OSS) 118 which the architecture 100 implements to create, deploy, manage, and maintain telecommunications products and services. As examples, the OSS/BSS systems 118 may include billing systems, directory and presence systems, authentication systems, provisioning systems, or other support systems. In executing the service request, the service broker 116 may additionally or alternatively communicate with a network layer 120 which may deliver or return service related data to the service broker 116. Responses from service providers 114 and the service broker 116 are returned to the third-party access gateway 110 for delivery to the originating third party requester.

The third party access gateway 110 provides a security layer between the third parties 102 and the exposed functionality implemented in the telecommunications architecture 100. At the same time, the service broker 116 provides an architectural layer for flexibly and efficiently processing the third party service requests. Thus, the architecture 100 allows a telecommunication service provider to expose core functionality toward the third parties 102 and process the service requests from the third parties 102 in a secure, standardized, and controlled manner.

FIG. 1 also shows a customer relationship management (CRM) system 122 in communication with the service broker 116. As will be explained in more detail below, the CRM system 122 may also issue telecommunication service requests to the service broker 116. As examples, the service requests submitted by the CRM system 122 may include service activation, suspension, resumption, or termination requests. The requests may result from interaction of customer care personnel with the CRM system 122 to establish, suspend, or terminate customer telecommunications products and services (e.g., cellular phone service).

Each service request may include a service type identifier field and a service request identifier field. In the discussion below, the TSO_LABEL field provides a service type identifier field and the TSO_ID field provides a service request identifier field. The TSO_LABEL in the service request is a service type identifier which specifies the type of service requested (e.g., a request to activate a specific telecommunications product or service). The TSO_ID in the service request is a service request identifier which provides an identifier of the service request itself (e.g., a unique identifier).

Figure 2:
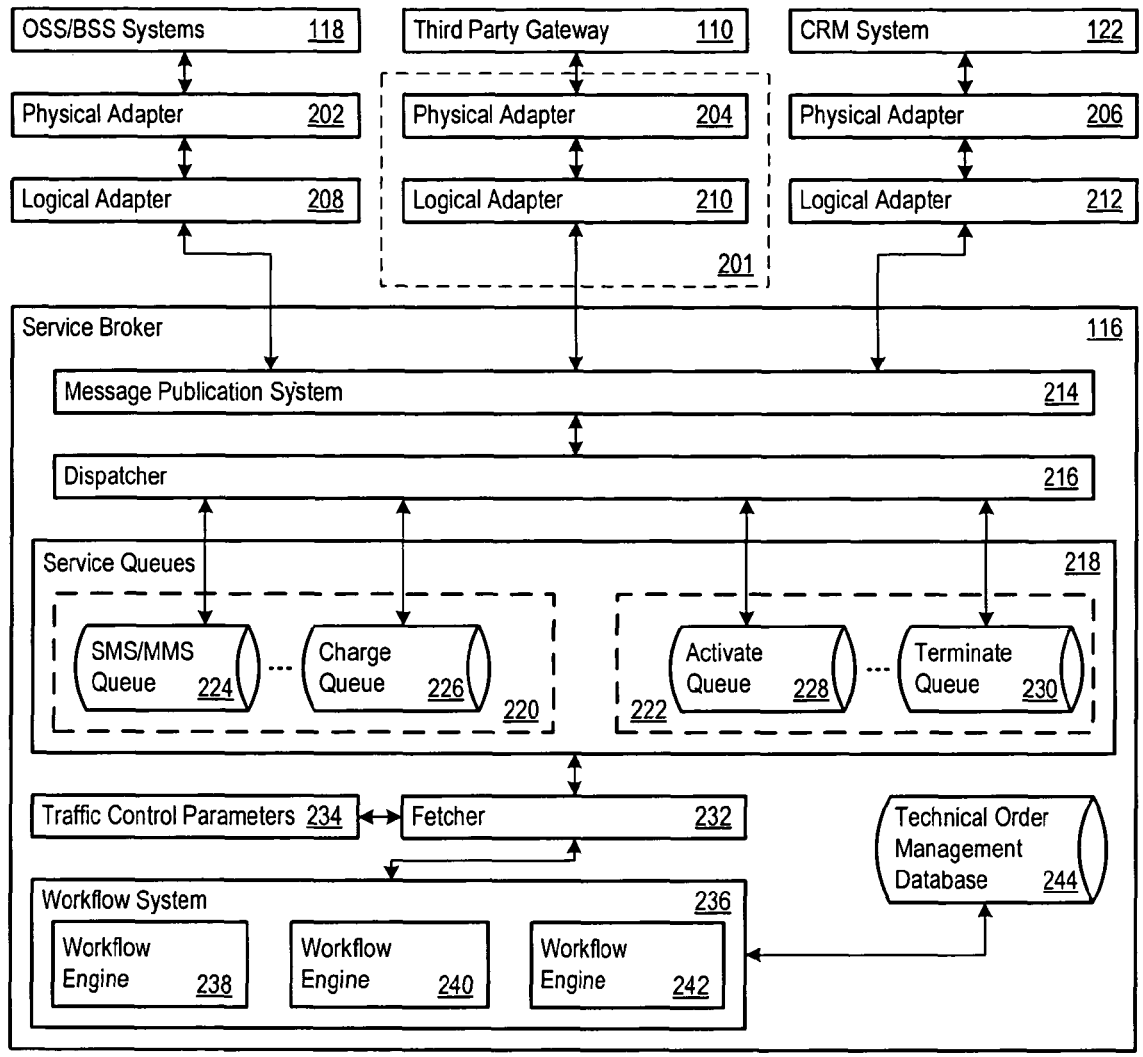
FIG. 2 shows a service broker in a telecommunications architecture.

FIG. 2 shows a more detailed view of one implementation of the service broker 116. As noted above, the service broker 116 connects to external systems including the OSS/BSS systems 118, the third party gateway 110, and the CRM system 122 through service request interfaces 201. The service request interfaces may include a physical adapter, a logical adapter, or both a physical and a logical adapter. The OSS/BSS systems connect to the service broker 116 through the physical adapter 202 and the logical adapter 208, the third party gateway connects to the service broker 116 through the physical adapter 204 and the logical adapter 210, and the CRM system connects to the service broker through the physical adapter 206 and the logical adapter 212.

The physical adapters 202-206 may be implemented by the communication software which handles communication between the external systems and the service broker. The logical adaptors 208-212 represent data translators, mappers, and/or transformers which execute message mapping between different data models in the service broker and the external systems. The logical adaptors 208-212 ensure that message data from the external systems arrives at the service broker 116 in the form expected by the service broker 116. In one implementation, the adapters 208-212 support transformation of messages and/or message content from a format defined by one schema (e.g., an XML schema for messages to adhere to in the third party gateway 110) to another format defined by another schema (e.g., an XML schema for messages received by the service broker 116).

A message publication system 214 provides a message bus which communicates messages between the external systems and the service broker 116. Additionally, the message bus may communicate message between components of the service broker 116 itself. The message publication system 214 receives messages assigned to a topic and publishes the messages to subscribers for that topic. The subscribers may be processing systems (e.g., the systems 110, 118, and 122), programs, or other entities. However, other message communication techniques may be used in other implementations, including batch file transfer, shared files or memory, or other interprocess communication techniques.

The message publication system and adapters 202-212 may be implemented, for example, with TIBCO Adapters (SM) and TIBCO Rendezvous (TM) messaging, available from TIBCO Software Inc. of Palo Alto, Calif. In other implementations, the physical adaptors may be implemented with BEA Weblogic Integration controls available from BEA Systems of San Jose, Calif. In one implementation, the messages are extensible Markup Language (XML) messages and the adapters perform transformation according to extensible Stylesheet Language for Transformations (XSLT) stylesheets. The transformations may transform data between schemas for any of XML, Hypertext Transport Protocol (HTTP), Simple Object Access Protocol (SOAP), Web Service Definition Language (WSDL), extensible Scheme Diagram (XSD), Java Database Connectivity/Open Database Connectivity (JDBC/ODBC) or other message format, content standards, or communication protocols.

The service broker 116 also includes a dispatcher system 216 which distributes incoming service requests into the service request queues 218. The service request queues 218 may include one or more independent queues assigned to specific types of service requests. In the example shown in FIG. 2, the service queues 218 include one or more third party gateway service request queues 220 which queue service requests received from the third party gateway 110 and one or more customer relationship management queues 222 which queue service requests from the CRM system 122.

As examples, the third party gateway service request queues 220 may include a message service request queue 224 (for queueing, for example SMS or MMS message delivery requests) and a Charge service request queue 226 (for queueing, for example, a charge request). Additional examples of queues 220 include an Authentication request queue and a Status request queue. Similarly, the CRM queues 222 may include an Activate Service request queue 228, a Terminate Service request queue 230, and other queues for service requests received from the CRM system 122. The queues 220 and 222 are not limited to the type and number described above. Instead, one or more queues may be implemented and assigned to queue any one or more types of service requests received from any one or more service requesters.

The service broker 116 includes a fetcher system 232. Under control of the traffic control parameters 234, the fetcher system 232 retrieves queued service requests from the service queues 218. The fetcher system 232 then delivers the retrieved service requests to a workflow system 236. The workflow system 236 initiates execution of workflow engines (e.g., the workflow engines 238, 240, 242) which determine and request execution of workflow steps in a pre-defined order to implement the service requests.

For example, to deliver and charge for an SMS message, the workflow system 236 may initiate execution of an SMS workflow engine which, as one step, issues a billing request to a billing system to charge for the SMS message, and which, as another step, issues a message transmission request to an SMS system to send the message. The workflow system 236 may be implemented with a Tibco InConcert™ workflow engine available from TIBCO Software Inc. of Palo Alto, Calif., or with other workflow systems.

The service broker also includes a technical order management (TOM) database 240. The TOM database 240 stores configuration rules which define a set of technical service order steps to be executed in a workflow which fulfills the service request. The TOM database 240 is explained in more detail below.

Figure 3:
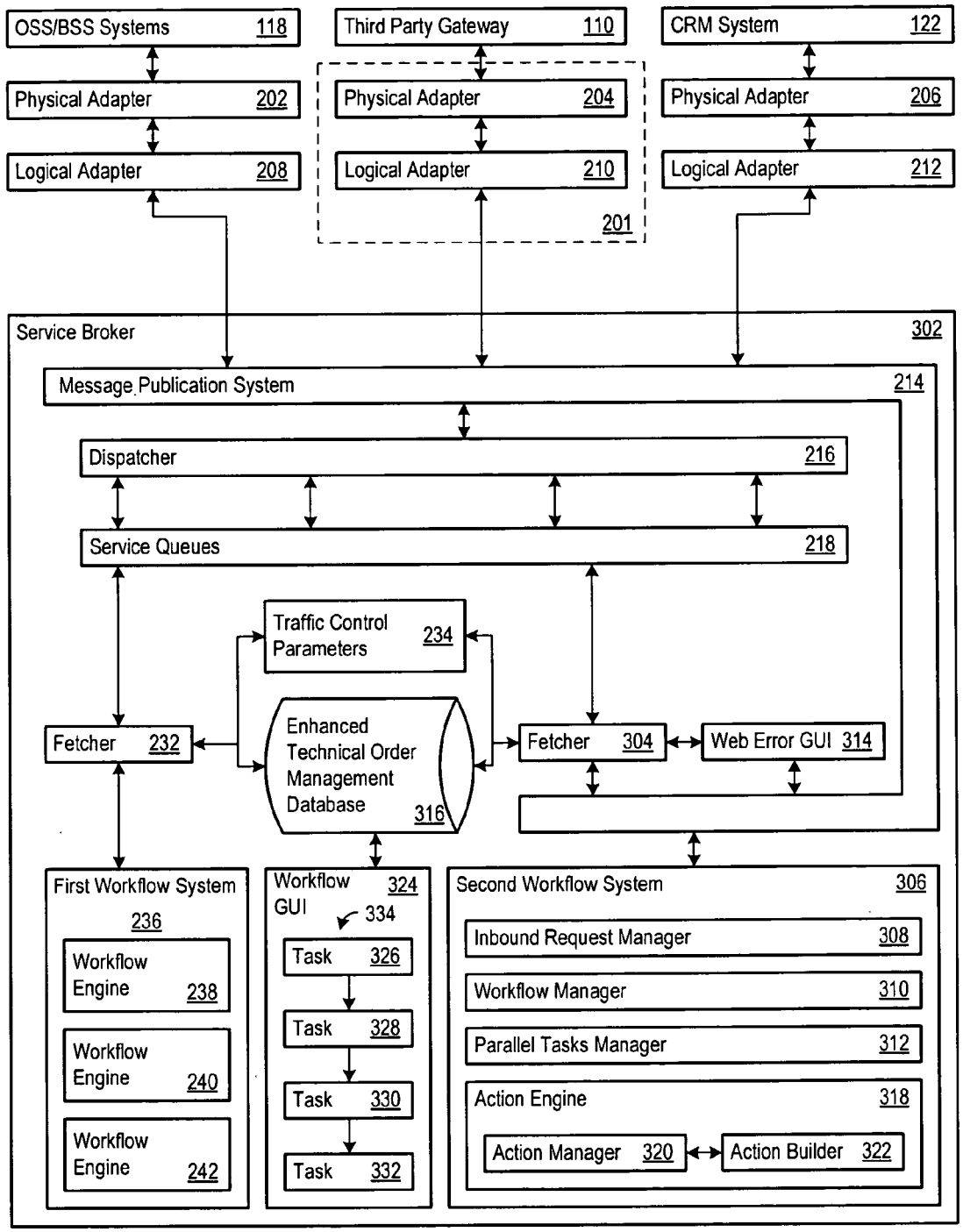
FIG. 3 shows an alternate implementation of a service broker in a telecommunications architecture.

FIG. 3 shows an alternative implementation of a service broker 302. The service broker 302 includes a second fetcher system 304. The second fetcher system 304 also retrieves service requests from the service queues 218 under control of the traffic control parameter 234. Alternatively, the second fetcher system 304 may operate under control of an independent set of traffic control parameters. Additional fetcher systems and sets of traffic control parameters may be provided.

The second fetcher system 304 employs a different workflow request delivery technique than the fetcher system 232. In particular, the second fetcher system 304 publishes workflow request messages to a message publication system, such as the system 214. The message publication system 214 may then deliver the workflow request message to the second workflow system 306 which subscribes to workflow request messages at the message publication system 214. In other words, the message publication system 214 relieves the second fetcher system 304 of the burden and bottleneck of directly calling workflow sequences.

Instead, the second workflow system 306 receives the published workflow request message and initiates execution of workflows to implement the service request. The second workflow system 306 need not be implemented in the same manner as the first workflow system 236. In the example shown in FIG. 3, the second workflow system 306 includes an inbound request manager 308, a workflow engine 310, and a parallel tasks manager 312. An action engine 318, including an action manager 320 and an action builder 322, executes network provisioning actions within a workflow. Each is explained in more detail below.

Adding the second workflow system 306 yields several benefits. In particular, the second workflow system 306 helps remove the potential bottleneck of processing service requests by directly calling the workflow system 236 through the first fetcher system 232. Furthermore, the first fetcher system 232 and the second fetcher system 304 may execute together, which not only increases end-to-end performance by processing service requests in parallel, but also provides a robust fault tolerant mechanism by providing two independent fetcher/workflow engine systems to process service requests.

The service brokers 302 or 116 also may include a web error graphical user interface (GUI). FIG. 3 shows an example of a web error GUI 314 provided for the second fetcher system 304. The web error GUI 314 may be implemented as a Web application of Java server pages running a Web server (e.g., a Weblogic Application server available from BEA Systems of San Jose, Calif.).

The web error GUI 314 populates a user interface display with information relating to any errors encountered during processing of the service requests. The web error GUI 314 may also provide input mechanisms through which a reviewer provides corrective input (e.g., input which changes the data or completes missing data in the service request or supporting workflow task to correct the service request or task), manually complete the service request or task, or resubmit service requests or tasks for processing.

In one implementation, each service request which has encountered an error may be represented in the web error GUI with a descriptive title and a hyperlink to additional detail of service request characteristics. The web error GUI 314 may further provide a search interface. The search interface accepts search criteria (e.g., MSISDN number, TSO_ID, date range, service request type, error code, customer or other identifier, or any other characteristic of a service request) and executes a responsive search and display of matching error records. Clicking on a hyperlink causes the web error GUI 314 to populate the display with error information specific to the selected service request and the additional characteristics available for that service request (e.g., request type, IMSI number, MSISDN number, sender, recipient, message text, customer name and address, or any other characteristics).

The web error GUI 314 accepts corrective input from the reviewer. The reviewer may direct the web error GUI 314 to re-publish the corrected service, task, or action to the fetcher system 304. The fetcher system 304 receives the corrected service request message and processes the corrected service request, task, or action in place of the original. In this manner, the fetcher system 304 saves valuable time and processing resources by continuing an already instantiated workflow at the point where the original service request encountered the error.

A separate web error GUI also may be provided for the first fetcher system 232. Rather than using the message publication system 214, the web error GUI for the first fetcher system 232 may communicate error information through function calls defined in an API. The function calls may be provided by the Tibco InConcert™ workflow engine, and the web error GUI may report error information and accept corrective input and noted above for the web error GUI 314.

The service broker may also provide a workflow GUI 324. The workflow GUI 324 provides a graphical interface for workflow definition which provides extensive configurability to the service broker. The workflow GUI 324 implements a drag and drop interface through which an operator may select and order tasks to create new workflows.

FIG. 3 shows one example in which the operator has arranged four tasks 326, 328, 330, and 332 sequentially to form a new workflow 334. Any number of tasks may be arranged in any order to define new workflows which customize the service broker for any functionality desired by the service provider. The workflow GUI 324 may provide graphical representations of workflows, tasks, and actions for one or more of the predefined workflows, tasks, and actions defined in the TOM database 316. The workflows, tasks, and actions may represent the workflows, tasks, and actions defined in the workflow table 902, task configuration table 904, and/or actions table 906 which are described below.

An enhanced TOM database 316 is also present in the service broker 302. The enhanced TOM database 316 extends the first TOM database 244 to support the second workflow system 306 and the web error GUI 314. As will be explained in more detail below, the enhanced TOM database 316 defines sequences of tasks and actions to be taken to implement specific service requests and provides reporting tables for the web error GUI 314.

FIG. 4 shows examples of traffic control parameters 234. In particular, FIG. 4 shows a functionality name parameter 402, a pool size parameter 404, and a polling time parameter 406. FIG. 4 also shows a submit timer parameter 408, a criteria parameter 410, and a standby parameter 412. Additional traffic control parameters include a wait parameter 414, a control locked parameter 416, and a data parameter 418.

Table 1, below, provides an explanation for each traffic control parameter 234:

TABLE 1

| Traffic control parameter | Description |
|---|---|
| FUNCTIONALITY NAME | A drop down list contains the types of service requests that support tuning through the traffic control parameters. Each type of service request may be tuned individually.<br>As examples, traffic control parameters may be established separately to control fetcher retrieval of service activation, deactivation, message delivery, charging, or any other type of service request from their respective queues. |
| POOLSIZE | The number of service request records that are processed in a single block. When the fetcher system starts, it takes POOLSIZE records (e.g., each identified by a Technical Service Order Identifier (TSO_ID)). The fetcher system submits the block of records one at a time to the workflow system. The record submissions are separated in time by the duration set by the SUBMIT_TIMER value.<br>If no value is provided, the fetcher system may process in one block all the TSO_IDs available for the functionality selected. |
| POLLING_TIMER | Establishes the time between fetcher system retrieval of a pool of service request records.<br>A default value may be provided. |
| SUBMIT_TIMER | Establishes the time between processing two records in the same pool. |
| STANDBY | This parameter may be set to "ON" or "OFF".<br>When set to "ON", the fetcher system may start a fetcher thread for the specified functionality (or the thread keeps running if previously started).<br>When set to "OFF", the fetcher thread stops without processing any more records. |
| WAIT | This parameter may be set to: "WAIT" or "CONTINUE".<br>When set to "WAIT", the fetcher system (e.g., the fetcher thread for the specified functionality) is suspended until resumed. The fetcher thread is still alive, but does not process any more records.<br>When set to "CONTINUE", the fetcher thread processes service request records. |
| CRITERIA | This drop-down list provides a selection of advanced parameters which may be set for service request processing.<br>Examples include POOL_ONLY, TSO_ID_SEQ, DATE_RANGE, and LOTTO.<br>If "POOL_ONLY" is selected, then the fetcher processes every record in the block without the qualifications explained below for other CRITERIA.<br>If "TSO_ID_SEQ" is selected, the DATA text field may be populated with a list of specific TSO_IDs to be processed in each block of service requests, separated by a semicolon (';') (e.g., 1234; 3254; 1324).<br>If "DATE_RANGE" is selected then the DATA field may further provide: |

TABLE 1-continued

| Traffic control parameter | Description |
| --- | --- |
|  | A date range by inserting two dates in the DATA text field that represent the beginning and the end date separated by a semicolon (';'). The format of the date may be DD/MM/YYYY. (e.g., 03/03/2003; 21/07/2003). Only a start date by inserting a date as a first element and a "NULL" string as a second element separated by a semicolon (';'). For example, 03/03/2003; NULL. Only an end date by inserting a "NULL" string as first element and a date as a second element separated by a semicolon (';'). For example, NULL; 03/03/2003. If "LOTTO" is selected, the Fetcher will start a single workflow to process a bulk request of size LOTTO_SIZE service requests. LOTTO_SIZE may be specified in the DATA field. |
| DATA | Provides a text entry field for further specifying the CRITERIA parameters. |
| Control locked | May be set to "TRUE" or "FALSE". When "TRUE", the traffic control parameters are locked. |

The traffic control parameters 234 may dynamically reconfigure the fetcher systems 232 and 304 at run time. To that end, the traffic control parameters 234 may be communicated to a traffic control manager process inside the fetcher systems 232 and 304 (e.g., via an HTTP connection, with the parameters embedded in the URL). The traffic control manager may then set the internal variables with the new parameters for the next retrieval of a block of service requests.

Figure 5:
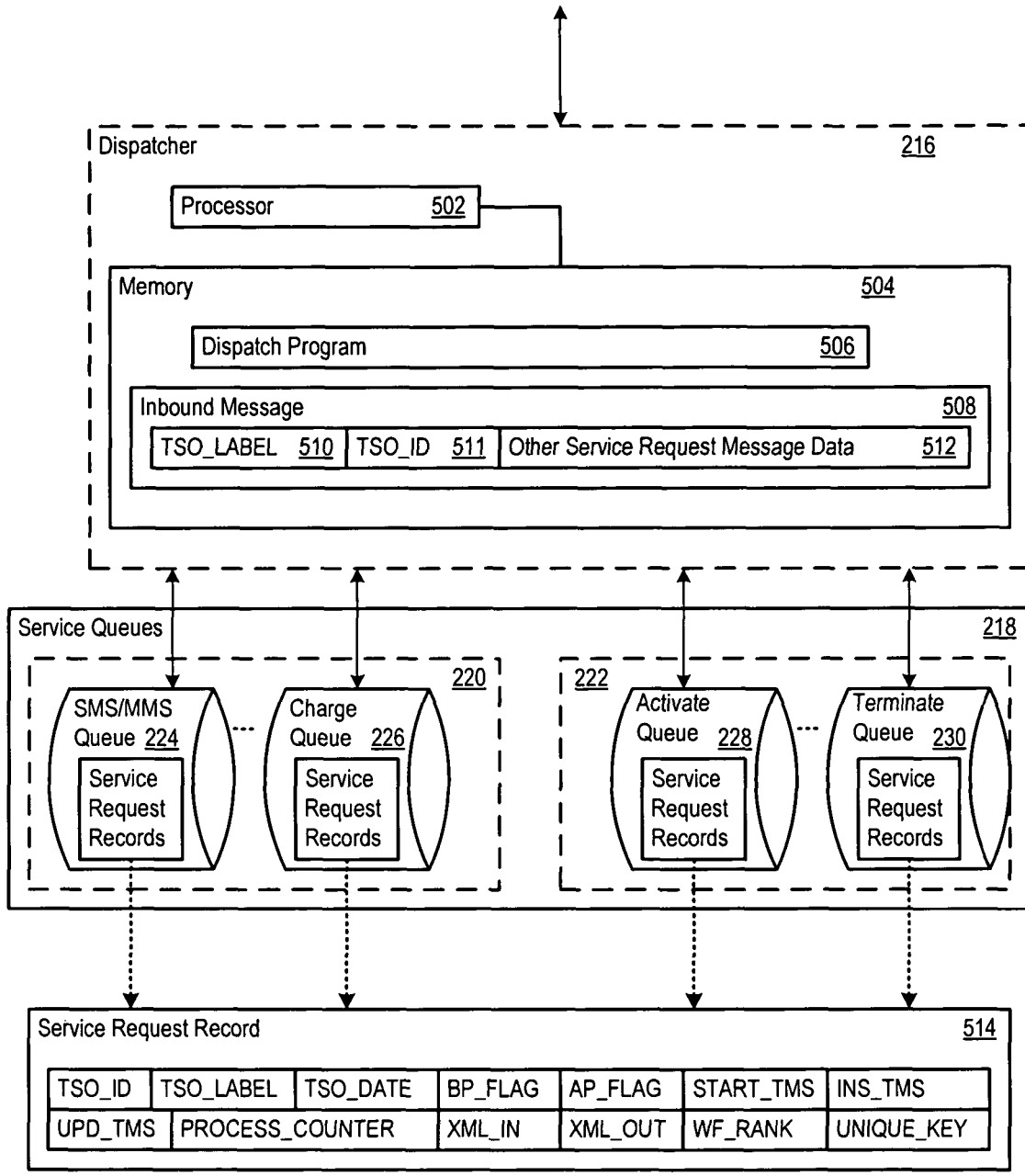
FIG. 5 illustrates a dispatcher system for a service broker in a telecommunications architecture.

FIG. 5 shows an example of an implementation of the dispatcher 216. The dispatcher 216 may include a processor 502 coupled to a memory 504. The memory 504 stores a dispatch program 506. The dispatch program 506 may be a multi-threaded process. The memory 504 also holds inbound messages 508 for processing by the dispatch program 506. The inbound messages 508 include a technical service order label (TSO_LABEL) field 510, a TSO_ID field 511, and service request message data 512 which further defines the service request (e.g., by specifying SMS message data, recipients, or other data supporting the service request). The TSO_LABEL field provides a service type identifier field which indicates the requested service.

The inbound messages 508 may be extensible Markup Language (XML) messages, which include identifying tags around each data element in the message. The dispatch program 506 examines the XML data in the inbound messages 508 and establishes a service request record in the service queues 218 based on the tagged fields in the XML data. In particular, based on the service identifier field (e.g., based on the TSO_LABEL), the dispatch program 506 establishes a service request record in a particular service queue based on the TSO_LABEL 510. In other words, the TSO_LABEL 510 identifies for the dispatch program 506 the type of service request, and therefore the appropriate service queue in which the service request should reside.

The service queues 218 may be implemented as database tables. FIG. 5 shows an example of a service request record 514 which may be defined in the service queues 218. Other service request record definitions may be implemented, however. The fields of the service request record 514 are explained below in Table 2.

TABLE 2

| Service Request Record Field | Description |
| --- | --- |
| TSO_ID | Technical Service Order Identifier (TSO_ID). This field provides a unique service request identifier, provided by the service requester. |
| TSO_LABEL | Technical Service Order Label (TSO_LABEL). This field provides a label which identifies the type of service request (e.g., service activation, message delivery, charge). |
| TSO_DATE | Technical Service Order Date. This field provides the date on which the service order was submitted. |
| BP_FLAG | This field provides a "Before Process" flag. The flag may indicate: 0 - row not processed at all (e.g., a newly created row by the dispatch program 506) 1 - the service request has been retrieved by the fetcher system 2 - the service request has been taken by the fetcher system, but the workflow engine has not been called 3 - the service request has been taken by the fetcher engine, which has called the workflow engine to process the service request. |
| AP_FLAG | This field provides an "After Process" flag. The flag may indicate: 0 - the workflow is not finished yet 1 - the workflow has terminated |

TABLE 2-continued

| Service Request Record Field | Description |
|---|---|
| START_TMS | This field provides a start process timestamp which may be inserted by the fetcher systems once it takes the service request. |
| END_TMS | This field provides an end process timestamp which may be inserted by the workflow engine once the workflow finishes. |
| INS_TMS | This field provides a row insert date which may be set by the dispatcher. |
| UPD_TMS | This field provides an updated time that either the BP_FLAG or AP_FLAG fields have changed. |
| PROCESS_COUNTER | Reserved for future use. |
| XML_IN | This field stores the input XML string (e.g., the inbound message 508). The XML string represents a service request submitted by an external requester. In other words, the XML string may define a request for SMS/MMS message delivery, service activation or deactivation, or any other telecommunication service request. |
| XML_OUT | This field stores the output XML string returned to the service requester. The output XML string carries the result of the workflow processing (e.g., a success message or error message, information responsive to the service request, or other data). |
| WF_RANK | Reserved for future use. |
| UNIQUE_KEY | Reserved for future use. |

TSO_ID, TSO_LABEL, and TSO_DATE are stored in separate fields. When the dispatcher program 506 receives the inbound message 508, the dispatch program may separately extract the TSO_ID, TSO_LABEL, and TSO_DATE data from the message 508 and store the data in the corresponding fields in the service request record 514. The fetcher systems 232 and 304 may therefore extract row data from the queue tables by any field or combination of fields.

Figure 6:
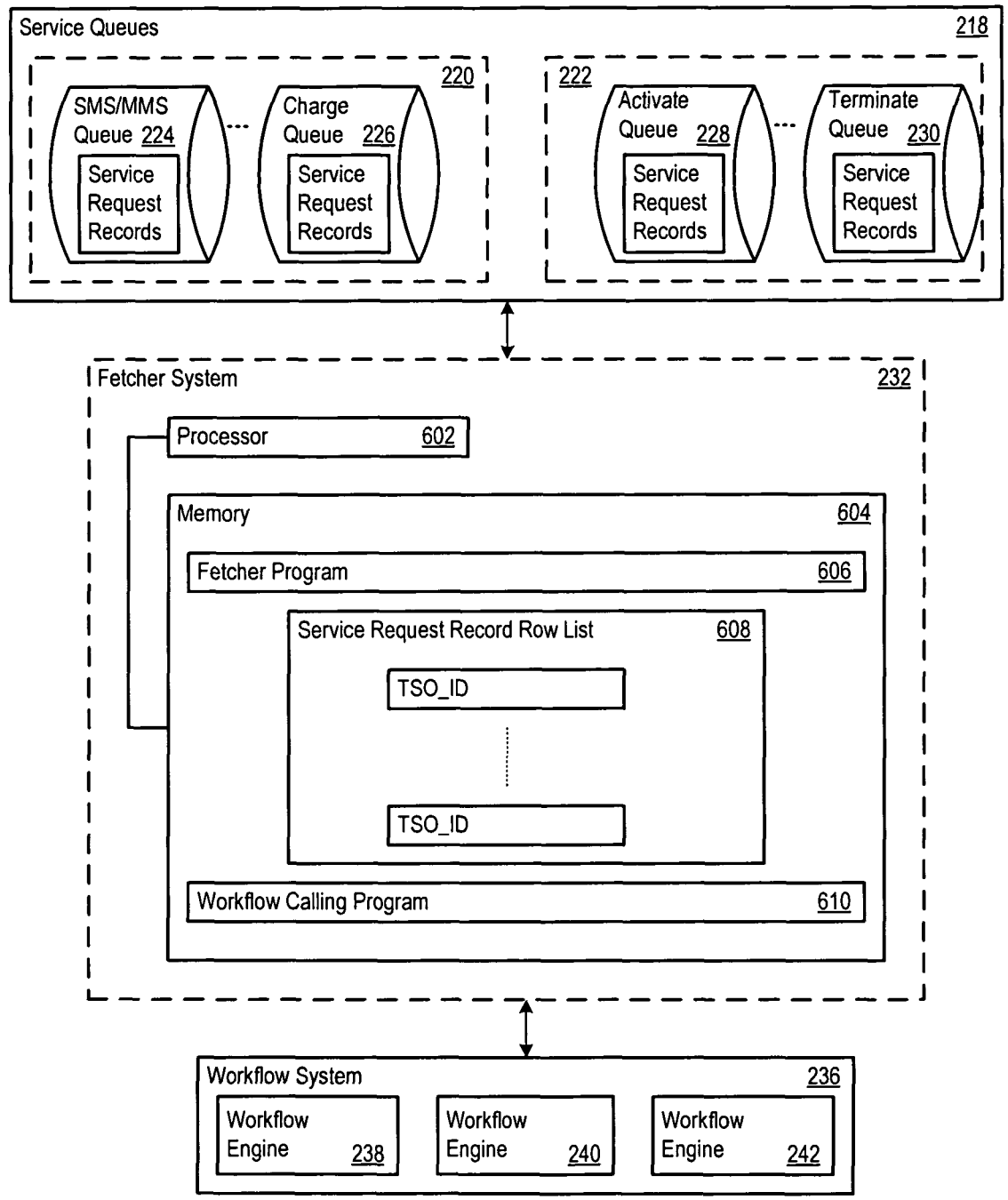
FIG. 6 shows a first fetcher system for a service broker in a telecommunications architecture.

In one implementation, when the dispatch program 506 inserts a row in a service queue table with a new service request record 514, the dispatch program 506 inserts the data for the following fields:
  TSO_ID
  TSO_LABEL
  TSO_DATE
  XML_IN
  BP_FLAG=0
  AP_FLAG=0
  INS_TMS=System Date FIG. 6 shows an implementation of the fetcher system 232. The fetcher system 232 includes a processor 604 coupled to a memory 604. The memory 604 stores a fetcher program 606 (e.g., a multithreaded process). The memory also holds a service request record row list 608. The entries in the service request record row list 608 point to service requests in the service queues 218.

Guided by the traffic control parameters 234, the fetcher program 606 polls the service queues 218. The fetcher program 606 retrieves pools of TSO_IDs from selected service request records. The fetcher program 606 may call a stored Structured Query Language (SQL) procedure to access the tables in the service queues 218.

The stored procedure may set the BP_FLAG to 1 for each row in the service queues 218 which meets the search criteria provided by the fetcher system. The stored procedure returns a row list 608 of the rows meeting the search criteria to the fetcher system 232. The row list 608 may include the TSO_ID field from each matched service request record.

The fetcher program 606 obtains the row list 608 from the stored procedure. The fetcher program 606 then passes the row list 608 to a workflow calling program 610. The workflow calling program 610 calls the workflow engine 236 to initiate execution of the appropriate workflow to carry out each service request represented in the service request records identified in the row list.

More specifically, the workflow calling program 610 processes the row list 608 asynchronously for each row. The workflow calling program 610 waits for the WAIT time specified in the traffic control parameters 234. When the WAIT time has expired, the workflow calling program 610 sets the BP_FLAG to '2' for the service request record currently being processed.

Next, the workflow calling program 610 directly calls the workflow system 236 to initiate the workflow which implements the service request associated with the current row. In the call to initiate the workflow, the workflow calling program 610 may asynchronously pass the TSO_ID field to the workflow system 236. The workflow calling program 610 then sets the BP_FLAG to '3' to indicate that the workflow has been called.

In the workflow system 236, the workflow engines execute workflow steps (e.g., tasks, actions, and TSOs) which implement the specific service request. In carrying out the service request, the first task which a workflow engine executes is to retrieve the XML_IN data from the queue table. The workflow engines retrieves the XML_IN data from the service request record matching the TSO_ID provided by the fetcher system 232. The service workflow thereby obtains a complete definition of the requested service, including supporting data for the requested service. For example, the XML_IN data for an SMS message delivery will include the message text and recipient identifiers.

The TSO_LABEL field specifies the requested service. The workflow executes the tasks which perform the requested service. For an SMS message delivery, for example, the workflow engine may send a charge message to a billing system, then send the message text to an SMS delivery subsystem. The workflow engine also returns a result of the service request processing. For example, the workflow may return a success message or error message, optionally with detailed explanation, or any other information which results from the service request processing.

The workflow finishes by updating the service request record for the applicable TSO_ID. The workflow engine writes the XML_OUT string into the service request record. The XML_OUT string may include the result of the service request processing. In addition, the workflow engine sets the AP_FLAG to '1' to indicate that the workflow has finished, and sets the END_TMS to the current system date (i.e., the date/time of workflow completion).

Figure 7:
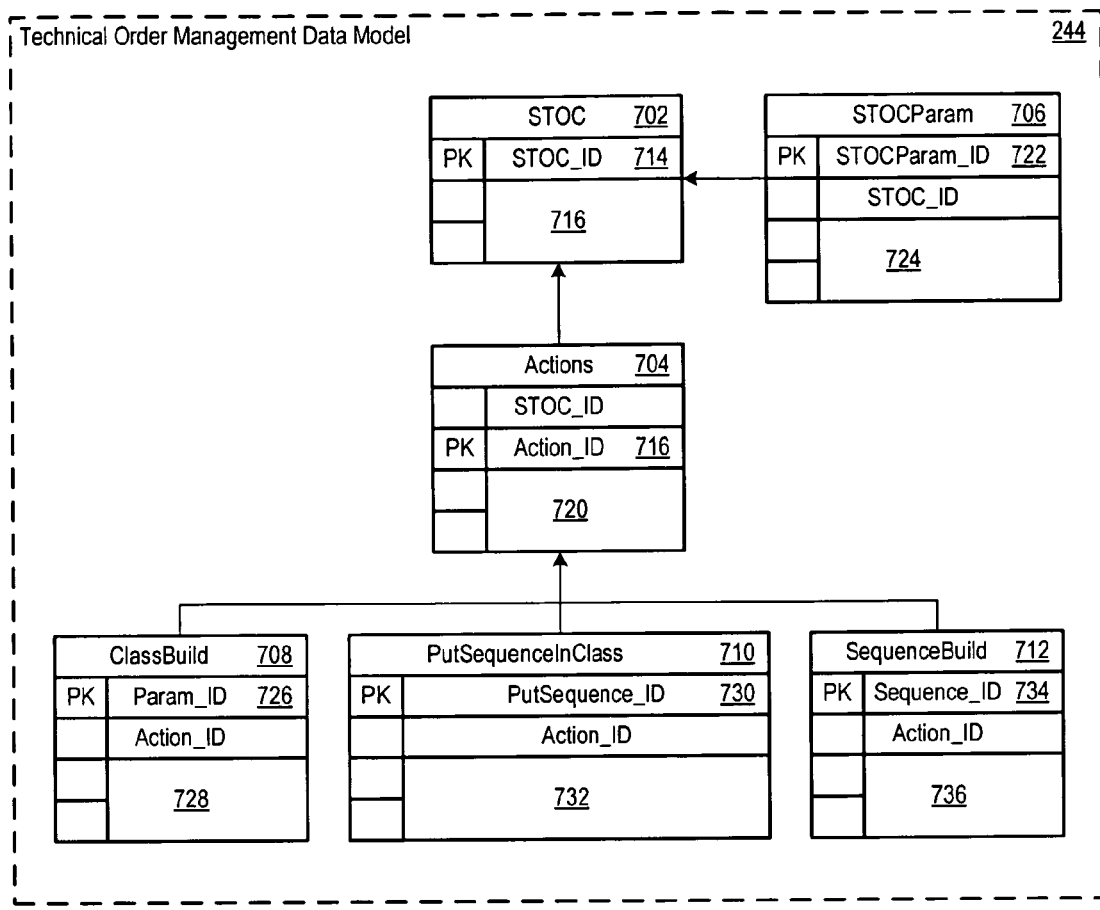
FIG. 7 illustrates a technical order management database for a fetcher system in a telecommunications architecture.

The workflow engines determine the tasks and actions to execute and the order of execution by consulting the technical order management (TOM) database 244. FIG. 7 shows one implementation of the data model for the TOM database 244. The data model is not limited to the implementation shown in FIG. 7, but may vary widely according to the particular implementation in which the data model is employed. The TOM database 244 includes a Service Technical Order Catalog (STOC) table 702, an Actions table 704, and a STOC parameter table 706. The TOM database 244 further includes a ClassBuild table 708, a PutSequenceInClass Table 710, and a SequenceBuild Table 712.

The STOC table includes a STOC_ID field 714 as a primary key, and additional fields 716. The Actions table includes an Action_ID field 718 as a primary key and additional fields 720. The STOCParam table 706 includes a STOCParam_ID field 722 as a primary key and additional fields 724. The ClassBuild table 708 includes a Param_ID field 726 as a primary key and additional fields 728. The PutSequenceInClass table 710 includes a PutSequence_ID field 730 as a primary key and additional fields 732. The SequenceBuild table 712 includes a Sequence_ID field 734 as a primary key and additional fields 736.

The STOC table 702 defines a workflow template of workflow steps referred to as Technical Service Orders (TSOs) for handling a service request. The Actions table 704 defines and links back to the STOC table the TSOs (i.e., the actions) to be executed and their execution order to accomplish any given service request. In some implementations, the database 228 may define an Inverse Action table similar to the Actions table 704. When an error occurs during processing of an action in a workflow, the associated Inverse Action may be executed. The Inverse Action may synchronize customer account status, order status, or other data between independent processing systems. The TOM database 244 further defines parameters for the actions, which may be received from the service requester, or which may be provided by the workflow engine itself. Each table 702-712, including the additional fields, is explained in more detail below.

TABLE 3

STOC Table

| Field | Description |
|---|---|
| STOCID | Unique numeric identifier of a record in the table and the associated TSO_LABEL in the record. |
| DESCRIPTION | Description of the requested service indicated by the TSO_LABEL. |
| LABEL | The TSO_LABEL which triggers the workflow. |

TABLE 4

Actions Table

| Fields | Description |
|---|---|
| STOCID | Unique identifier of a TSO_LABEL (see the STOC table). |
| ACTIONID | Unique identifier of the single action to perform (i.e., TSO). |
| SUBJECT | The subject on which to publish a message (e.g., via a Tibco message service) which requests execution of the TSO. A subscribing system may then receive the message and execute the specified TSO. |
| CLASSNAME | The path and name of the class structure which will be sent in the message. |
| SLOTNAME | The name of the job slot that stores the class structure to be sent in the message payload. |
| ACTIONSEQUENCE | Establishes the execution order for TSOs with the same STOCID. For example, '1' indicates the first action to be performed and '2' indicates the second action. |
| ERROR CODE | Reserved. |
| DESCRIPTION | May be set to "Y" if the TSO must be executed or "N" if the TSO will not be executed. This field may be used to temporarily disable a TSO. |
| ASYNC | Indicates whether a TSO call is asynchronous ("Yes") or not ("No"). |
| REPLYSUBJECT | The reply subject for an asynchronous call. |
| PLATFORM | A label identifying the system which is going to be called to perform the TSO. The workflow engine may tailor the message payload based on the called system. |

TABLE 5

STOCParam Table

| Fields | Description |
|---|---|
| STOCPARAMID | Unique identifier for every entry in the table. |
| STOCID | Unique identifier of the TSO_LABEL (see the STOC table). |
| DESCRIPTION | A description of the parameter. |
| PLATFORMID | A numeric identifier for the platform to be called to perform the TSO. |

TABLE 5-continued

STOCParam Table

| Fields | Description |
| --- | --- |
| SEQUENCENUM | Reserved. |
| PARAMNAME | Name of the parameter used to build a temporary slot for the dynamic attributes received from the service requester (e.g., received from the CRM system). |
| ACTIONID | Unique identifier of the action (i.e., the TSO). |
| STOCPARAM | Name of the dynamic attribute received from the service requester. |

TABLE 6

ClassBuild Table

| Fields | Description |
| --- | --- |
| PARAMID | Unique identifier for every entry in the table. |
| ACTIONID | Unique identifier of the action (i.e., the TSO). |
| PARAMNAME | Name of the attribute in the class which is going to be filled with DEFAULTVALUE |
| CLASSNAME | Name of the class which includes the PARAMNAME attribute. |
| SLOTNAME | Name of the job slot which will contain an instance of the class contained in CLASSNAME. |
| STOCPARAMNAME | Name of the attributes in ATTRIBUTES SLOT entry from which will be taken the dynamic value to fill the PARAMNAME attribute. |
| DEFAULTVALUE | The value which will fill the PARAMNAME attribute. |
| STOCPARAM | Name of the dynamic attribute received from the service requester. |

TABLE 7

PutSequenceInClass Table

| Fields | Description |
| --- | --- |
| PUTSEQUENCEID | Unique identifier for every entry in the table. |
| ACTIONID | Unique identifier of the action (i.e. the TSO). |
| PARAMNAME | Name of the attribute in the class which is going to be filled with SOURCESLOT value. |
| DESTINATIONSLOT | Name of the job slot which contains the PARAMNAME attribute to be filled. |
| SOURCESLOT | Name of the job slot which contains an instance of the class contained in CLASSNAME. |
| SEQUENCEORDER | Numeric value which identifies the order in which the sequences will be filled in the class structure. |

TABLE 8

SequenceBuild Table

| Fields | Description |
| --- | --- |
| SEQUENCEID | Unique identifier for every entry in the table. |
| ACTIONID | Unique identifier of the action (i.e. the TSO). |
| SEQUENCENAME | Path and name of the sequence that will be initialized and filled with elements from CALSSSLOTNAME. |
| SEQUENCESLOTNAME | Name of the job slot which contains the initialized SEQUENCENAME sequence. |
| CLASSSLOTNAME | Name of the job slot which will contain an instance of the class contained in CLASSNAME. |
| SEQUENCEORDER | Numeric value which identifies the order with which the sequences will be filled in the class structures. |

The workflow system 236 divides service order processing into two tasks. The first task is to determine how a service request is split into TSOs by searching the workflow definitions in the TOM database 244. The second task is to manage the TSOs by sending them in the correct sequence, receiving responses, and handling errors.

Based on the TSO_LABEL and the definitions established in the TOM database 244, the workflow system 236 determines the set of TSOs to execute and their order. The workflow system 236 also builds an attribute list for each TSO to be executed. The attributes may be specified in whole or in part by the service requester (e.g., the CRM system 122) and may also be specified in whole or in part by the TOM database 244. As the TSOs are executed, the workflow engine increments an index which points to the current TSO to execute.

The workflow engine builds a message requesting execution of the TSO. For example, the message may be published to a provisioning system which carries out an action specified in the message, as part of implementing the overall service request. The TOM database 244 supports building the messages, and provides the order in which the TSO should execute, attributes for the TSO (e.g., static attributes specified within the TOM database 244 and dynamic attributes submitted by the service requester), a subject to which to publish the message, and the other parameters described above.

Thus, the TOM database 244 provides the configuration rules which split a service request workflow associated with a TSO_LABEL into a set of TSOs which implement the service request. The TOM database 244 thereby provides an extremely flexible, reconfigurable, and extendible mechanism for defining workflows, TSOs which implement the workflows, and the order in which the TSOs execute.

Figure 8:
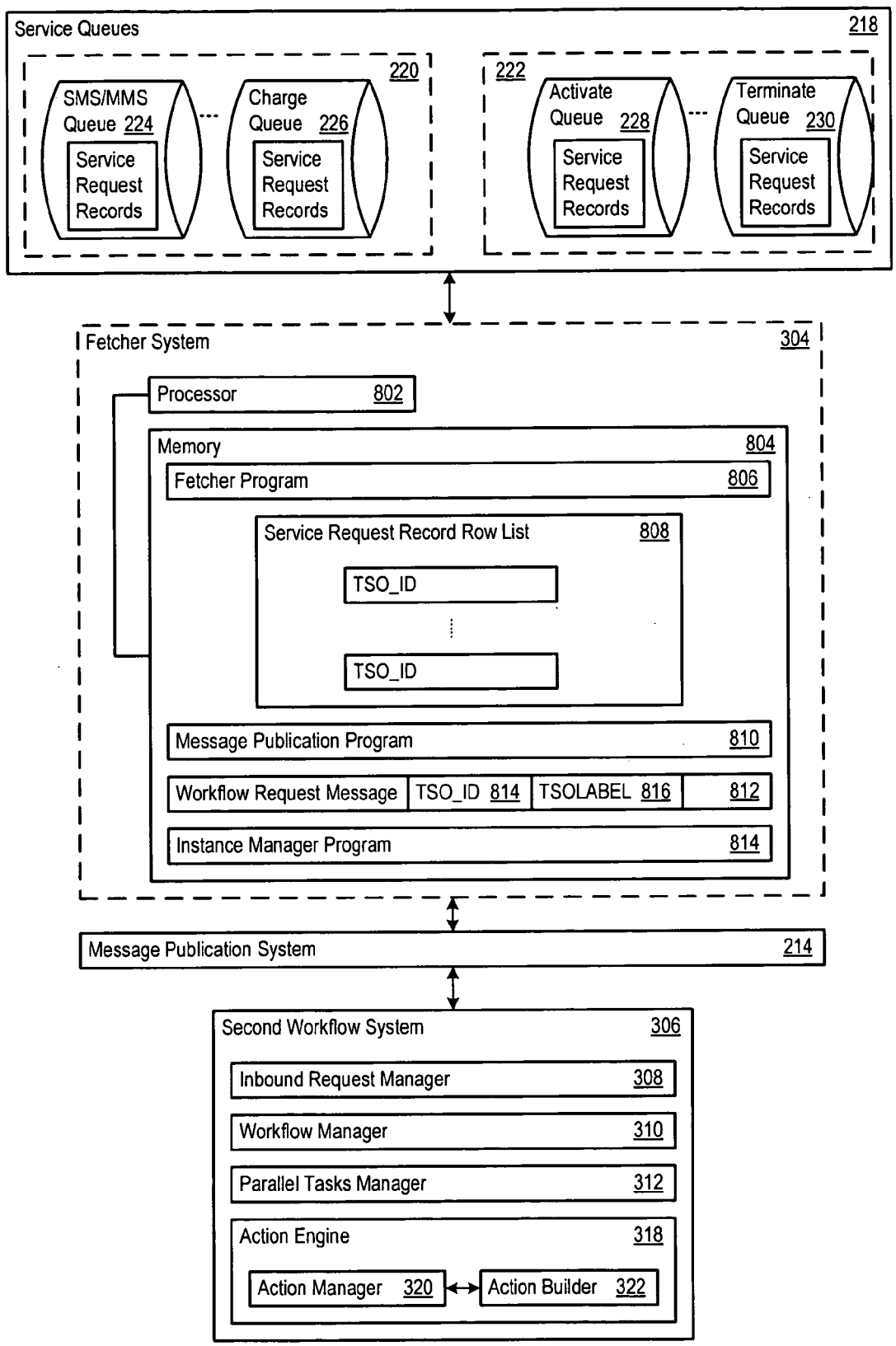
FIG. 8 shows a second fetcher system for a service broker in a telecommunications architecture.

FIG. 8 shows an example implementation of the second fetcher system 304. The fetcher system 304 may include a processor 802 coupled to a memory 804. The memory 804 stores a fetcher program 806 (e.g., a multithreaded process). The memory also holds a service request record row list 808. The entries in the service request record row list 608 point to service requests queued in the service queues 218 and submitted by the third party gateway 110, CRM system 122, or any other external service requester.

Guided by the traffic control parameters 234 (or an independent set of traffic control parameters established for the fetcher system 304), the fetcher program 806 polls the service queues 218. The fetcher program 806 retrieves blocks of TSO_IDs from matching service request records. The fetcher program 806 may execute a stored Structured Query Language (SQL) procedure for access to the tables in the service queues 218.

For each service request to be processed, the fetcher program calls an instance manager program 814. The instance manager program populates tables in TOM database 316 to instantiate workflow tables for the service request. The TOM database tables are described in more detail below.

The fetcher program 806 passes the row list 808 to a message publication program 810. The message publication program 810 publishes workflow request messages 812 (which specify service requests) to the second workflow system 306. The fetcher system 304 thus removes a potential bottleneck of directly calling a workflow engine by allowing the message publication system 214 to deliver the workflow request messages to the second workflow system 306. The workflow request message may specify the TSO_ID (in a TSO_ID field 814) and TSO_LABEL (in a TSO_LABEL field 816). The TSO_ID and the TSO_LABEL are obtained from the service records in the service queues 218. The fetcher system 304 may wait for a response from the message publication system 214 after the fetcher system 304 publishes each workflow request message.

More specifically, the request/reply messages may be defined as shown in Table 9-12 below:

TABLE 9

Workflow request message

<?xml version="1.0" encoding="ISO-8859-1"?>
   <WORKFLOW_REQUEST
   xsi:noNamespaceSchemaLocation="BW_COMMON.xsd">
    <TSOID>TSO IDENTIFIER</TSOID>
    <TSOLABEL>TSO LABEL VALUE</TSOLABEL>
    <PARAM name="MSISDN" value="msisdn number"/>
    <PARAM name="IMSI" value="imsi number"/>
   </WORKFLOW_REQUEST>
The MSISDN and IMSI values are optional.

TABLE 10

Positive Acknowledgement (Reply)

<?xml version="1.0" encoding="ISO-8859-1"?>
<RESULT_STATUS xsi:noNamespaceSchema-
Location="BW_COMMON.xsd">
   <STATUS_CODE>0</STATUS_CODE>
</RESULT_STATUS>

TABLE 11

Negative Acknowledgement (Reply)

<?xml version="1.0" encoding="ISO-8859-1"?>
<RESULT_STATUS xsi:noNamespaceSchema-
Location="BW_COMMON.xsd">
   <STATUS_CODE>1</STATUS_CODE>
   <ERROR_CODE>eai_10000</ERROR_CODE>
   <ERROR_DESCRIPTION>Description</ERROR_DESCRIPTION>
</RESULT_STATUS>

TABLE 12

Common Schema

<?xml version="1.0" encoding="UTF-8"?>
<xs:schema xmlns:xs="http://www.w3.org/2001/XMLSchema"
elementFormDefault="qualified" attributeFormDefault="unqualified">
  <xs:element name="WORKFLOW_REQUEST">
   <xs:annotation>
    <xs:documentation>Comment describing your root element</xs:documentation>
   </xs:annotation>
   <xs:complexType>
   <xs:sequence>
   <xs:element name="TSOID" type="xs:string"/>
   <xs:element name="TSOLABEL" type="xs:string"/>
   <xs:element name="PARAM" maxOccurs="unbounded">
   <xs:complexType>
   <xs:attribute name="name" type="xs:string" use="required"/>
   <xs:attribute name="value" type="xs:string" use="required"/>
    </xs:complexType>
   </xs:element>
   </xs:sequence>
  </xs:complexType>
</xs:element>

TABLE 12-continued

Common Schema

```
<xs:element name="RESULT_STATUS">
    <xs:complexType>
        <xs:all>
<xs:element name="STATUS_CODE" type="xs:int"/>
<xs:element name="ERROR_CODE" type="xs:string"
minOccurs="0"/>
            <xs:element
name="ERROR_DESCRIPTION" type="xs:string" minOccurs="0"/>
        </xs:all>
    </xs:complexType>
</xs:element>
</xs:schema>
```

Figure 9:
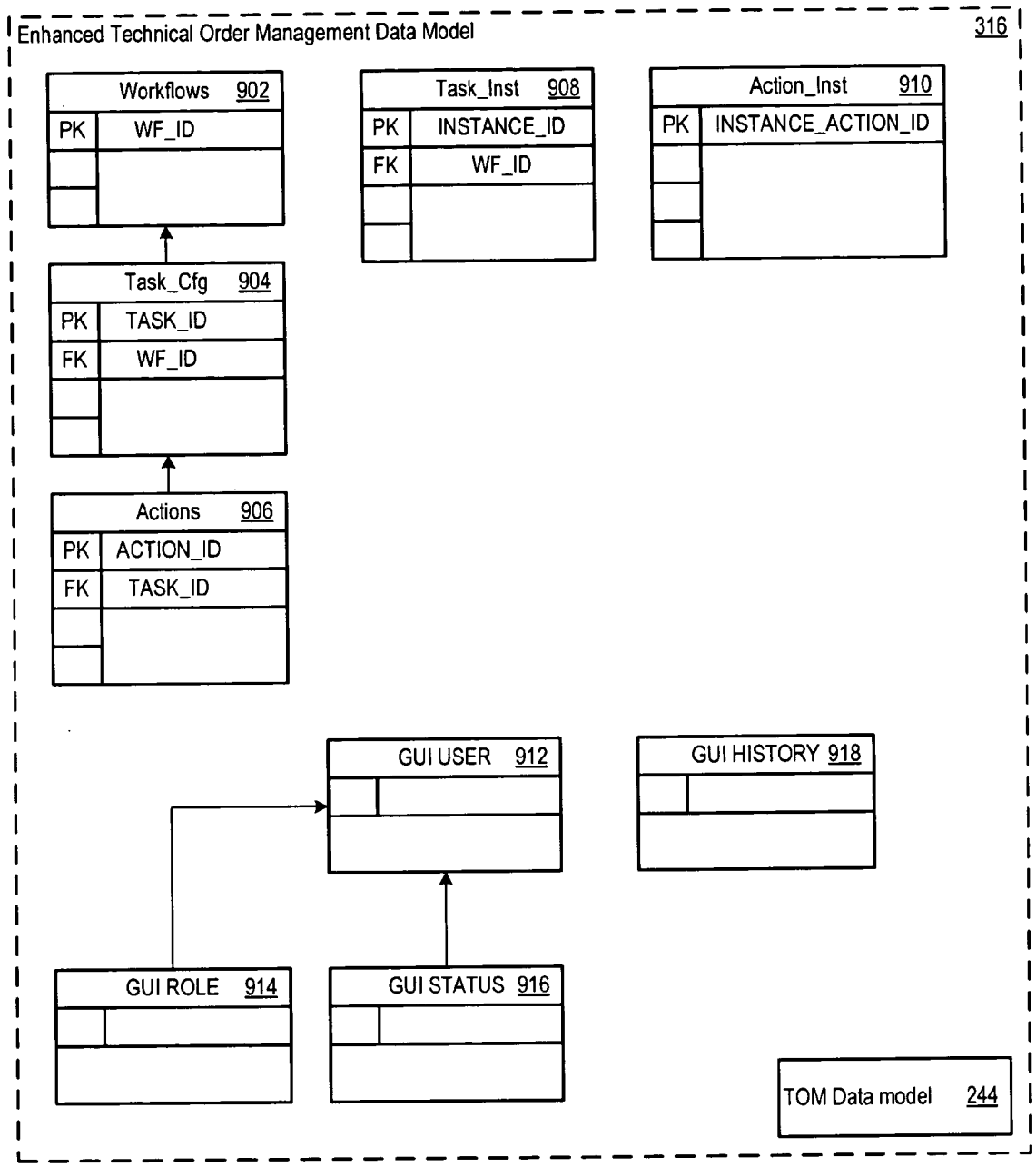
FIG. 9 illustrates an enhanced technical order management database for a fetcher system in a telecommunications architecture.

FIG. 9 shows the enhancements which are present in the TOM database 316 which supports the second fetcher system 304. Sequences of steps to take to implement a service request are defined by the Workflows table 902, Task_cfg table 904, and the Actions table 906. In particular, the Workflow table 902 defines a workflow template, the Task_cfg table 904 defines tasks which implement the workflow, and the Actions table 906 defines actions associated with each task. The tasks and actions may be executed, for example, by processes running in an external Tibco BusinessWorks™ processing system. A supporting task instance table 908 and a supporting actions instance table 910 are also present. Each table is described in more detail below.

TABLE 13

Workflows Table

| Fields | Description |
| --- | --- |
| WF_ID | Unique numeric identifier of a workflow template definition. |
| WF_LABEL | The TSOLABEL for the service request implemented by this workflow template. |
| WF_DESCRIPTION | Description of the workflow template. |
| TABLE_TASK_INST | Provides the Run Time table name for process tasks. |
| TABLE_ACTION_INST | Provides the Run Time table name for task actions. |

TABLE 14

Task_Cfg

| Fields | Description |
| --- | --- |
| TASK_ID | Unique numeric identifier of a workflow task template definition. |
| WF_ID | The foreign key to the workflow template to which the task belongs. |
| TASK_DESCRIPTION | Description of the task template. |
| TASK_ORDER | The index of the task, which indicates the execution order of the task within the template. |
| TASK_SKIP | May be:<br>'N': the task will be executed.<br>'Y': the task will be skipped. |
| PROCESS_ID | Provides an identifier of a process which implements the task logic. |
| EXTERNAL_SYSTEM_ID | An identifier of an external system which performs the task. |
| DETACHED | May be:<br>'N': the task will be executed sequentially with other tasks.<br>'Y': the task will be executed in parallel with other tasks. |
| PREVIOUS_TASK_ID | Provides the TASK_ID of the previous task in the sequence of tasks. |
| NOTIFY_TIMEOUT | Provides a timeout value (e.g., in ms) which the workflow system 306 may use to try to synchronize the response of parallel tasks. |
| SYNC_PREVIOUS_TASK_ID | Provides the TASK_ID of the previous task in the sequence of tasks, for parallel tasks. |

TABLE 15

Actions

| Fields | Description |
| --- | --- |
| ACTION_ID | Unique numeric identifier of a network provisioning action template definition. |
| TASK_ID | The foreign key to the provisioning task to which the action belongs. |
| ACTION_DESCRIPTION | Provides a description of the action template. |
| ACTION_ORDER | The index of the action, which indicates the execution order of the action within the task. |
| ACTION_SKIP | May be:<br>'N': the action will be executed.<br>'Y': the action will be skipped. |
| PROCESS_ID | Provides an identifier of a process which implements the action logic. |

TABLE 15-continued

Actions

| Fields | Description |
| --- | --- |
| DETACHED | May be:<br>'N': the action will be executed sequentially.<br>'Y': the task will be executed in parallel. |
| PROCESS_ID_XMLIN | Provides an identifier of a process which extracts the XML_IN data from the service queue to support execution of the action. |
| PROCESS_ID_MAPPER | Provides an identifier of a process which creates the message for the action to be sent to the message publication network interface. |
| NOTIFY_TIMEOUT | Provides a timeout value (e.g., in ms) which the workflow system 306 may use to try to synchronize the response of parallel actions. |

The TASK_INST table 908 may include the same fields as the TASK_CFG table 904 and the following additional fields:

TABLE 16

Task Instance Table

| Fields | Description |
| --- | --- |
| INSTANCE_ID | Numeric Primary Key of a task. |
| STATUS_CODE | The status code (e.g., 0, success or 1, error) of the task's sub-process execution. |
| ERROR_CODE | The error code of the task's sub-process execution. |
| ERROR_DESCRIPTION | The error description of the task's sub-process execution. |
| TSO_ID | The unique identifier for the TSO to be processed. |
| MSISDN | The MSISDN associated with the TSO. |
| IMSI | The IMSI associated with the TSO |
| XML_IN | The XML representation of the input message (service request) sent to the external system through the sub-process defined for the tasks. |
| XML_OUT | The XML representation of the output message (reply) from the external system through the sub-process defined for the tasks. |
| STATUS | The tasks status. |
| REP_COUNT | Reserved. |
| INS_TMS | The timestamp of row insertion. |
| UPD_TMS | The timestamp of the last modification of the row. |
| REQ_TMS | The timestamp of the message (request) sent to the external system through the sub-process defined for the tasks. |
| RESP_TMS | The timestamp of the message (reply) from the external system through the sub-process defined for the tasks. |
| NOTIFY_KEY | A unique key for synchronizing a parallel task. |

The ACTION_INST table 910 may include the same fields as the ACTIONS table 906 and the following additional fields:

TABLE 17

Action Instance Table

| Fields | Description |
| --- | --- |
| INSTANCE_ACTION_ID | Primary Key of an instantiated action. |
| INSTANCE_ID | Foreign Key to the instantiated task into the TASK_INST table. |
| STATUS_CODE | The status code (e.g., 0, success or 1, error) of the action's sub-process execution. |
| ERROR_CODE | The error code of the action's sub-process execution. |
| ERROR_DESCRIPTION | The error description of the action's sub-process execution. |
| TSO_ID | The unique identifier for the TSO to be processed. |
| MSISDN | The MSISDN associated with the TSO. |
| IMSI | The IMSI associated with the TSO |
| XML_IN | The XML representation of the input message (request) sent to the network interface through the sub-process defined for the action. |

TABLE 17-continued

Action Instance Table

| Fields | Description |
| --- | --- |
| XML_OUT | The XML representation of the output message (reply) from the network interface through the sub-process defined for the action. |
| STATUS | The action status. |
| REP_COUNT | Reserved. |
| INS_TMS | The timestamp of row insertion. |
| UPD_TMS | The timestamp of the last modification of the row. |
| REQ_TMS | The timestamp of the message (request) sent to the network interface through the sub-process defined for the action. |
| RESP_TMS | The timestamp of the message (reply) from the network interface through the sub-process defined for the action. |
| NOTIFY_KEY | A unique key for synchronizing a parallel action. |

In addition, the enhanced TOM database 316 provides support for the web error GUI 314. In particular, the enhanced TOM database 316 includes a GUI User table 912, GUI role table 914, and a GUI status table 916. Also included is a GUI history table 918. Each table is described in more detail below.

TABLE 18

GUI User

| Fields | Description |
| --- | --- |
| FIRST_NAME | GUI User First Name |
| LAST_NAME | GUI User Last Name |
| USERNAME | GUI Username (the GUI login username) |
| PASSWORD | GUI Password (the GUI login password) |
| LASTLOGON_DATE | GUI User Last logon date |
| EXPIRATION_DATE | GUI User account expiration date |
| CREATE_DATE | GUI User account creation date |
| ROLE_ID | GUI User Role ID (Foreign key to table GUIROLE) |
| STATUS_ID | GUI User Status ID (Foreign key to table GUISTATUS) |

TABLE 19

GUI Role

| Fields | Description |
| --- | --- |
| ROLE_ID | GUI User Role ID |
| ROLE_DESCRIPTION | GUI Role Description |

TABLE 20

GUI Status

| Fields | Description |
| --- | --- |
| STATUS_ID | GUI Status ID |
| STATUS_DESCRIPTION | GUI Status Description |

TABLE 21

GUI History

| Fields | Description |
| --- | --- |
| USERNAME | GUI Username (the GUI login username) |
| TSO_ID | The unique identifier for the TSO to be processed |
| WF_LABEL | The TSO_LABEL. |
| EXTERNAL_SYSTEM_ID | An identifier of an external system which executes the TSO. |
| MSISDN | The Mobile Subscriber Integrated Services Digital Network (MSISDN) number of the TSO. |
| IMSI | The International Mobile Subscriber Identifier (IMSI) number of the TSO. |
| INSTANCE_ID | Numeric Primary Key of an instantiated process task. |
| TASK_ID | Unique numeric identifier of a workflow task template definition. |
| TASK_DESCRIPTION | Provides a description of the task template. |
| INSTANCE_PROV_ID | Numeric Primary Key of an instantiated provisioning action. |
| ACTION_ID | Unique numeric identifier of a network provisioning action template definition |
| ACTION_DESCRIPTION | Description of the action template. |
| XML_IN | Provides the XML representation of the input message (request) sent to the external system for execution of the TSO. |

TABLE 21-continued

GUI History

| Fields | Description |
| --- | --- |
| XML_OUT | Provides the XML representation of the output message (reply) received from the external system. |
| GUIACTION | The GUI user action description (i.e., RESUBMIT TASK) of the action taken by the web error operator. |
| GUIACTION_DETAILS | Provides additional details for the GUI user action. |
| FROM_STATUS | Provides the status of a process task/action before the GUIACTION is performed. |
| TO_STATUS | Provides the status of a process task/action after it has been performed. |
| INS_TMS | Provides a timestamp for insertion of the row. |

For each service request, and prior to publishing a corresponding service request message, the instance manager program 814 populates the TASK_INST table 908 with the workflow tasks to be executed. The instance manager program 814 also populates the ACTION_INST table 910 with the provisioning actions within each task. The data which populates the tables 908 and 910 is obtained from the templates defined in the catalog tables 902, 904, and 906. Thus, each service request to be processed has an instantiated workflow ready in the TASK_INST table 908 and ACTION_INST table 910.

The second workflow system 306 receives the published workflow request messages from the message publication system 214. The workflow system 306 first processes the workflow request messages through an inbound request manager 308.

Figure 10:
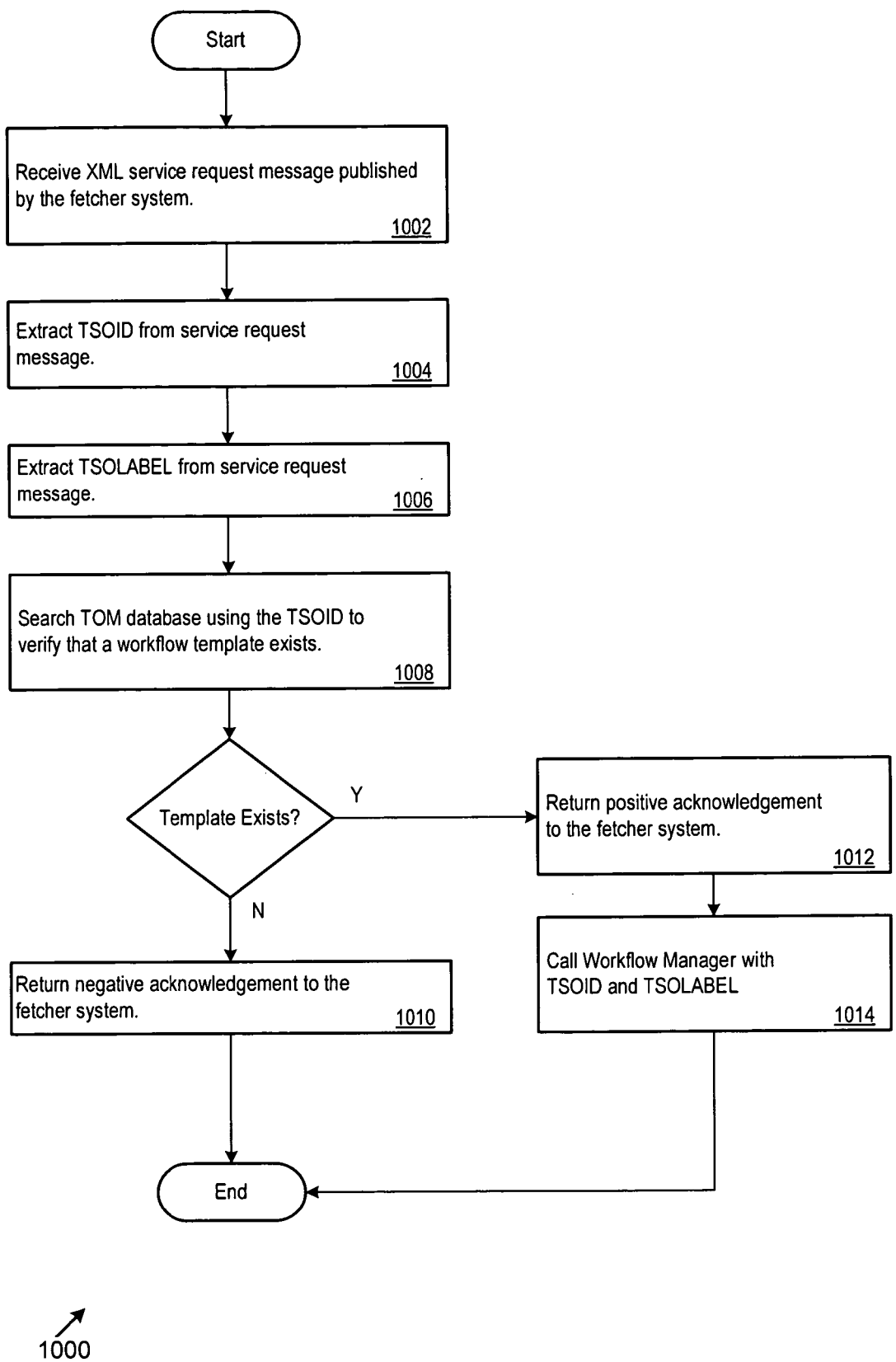
FIG. 10 shows the acts that an inbound request manager may take to process a telecommunications service request.

FIG. 10 shows an example flow diagram of the actions 1000 taken by the inbound request manager 308. The inbound request manager 308 receives the published service request message which was published by the message publication system 214 (Act 1002). The inbound request manager extracts a TSO_ID from the service request message (Act 1004) and a TSO_LABEL from the service request message (Act 1006).

With the TSO_ID, the inbound request manager 308 searches the enhanced TOM database 314 for an instantiated workflow template which implements the service request represented by the TSO_ID. If no template has been defined, the inbound request manage 308 returns a Negative acknowledgement to the fetcher system 304 (Act 1010). Otherwise, the inbound request manager 308 returns a Positive acknowledgement to the fetcher system 304 (Act 1012) and calls the Workflow engine 310 with the TSO_ID and TSO_LABEL (Act 1014).

Figure 11:
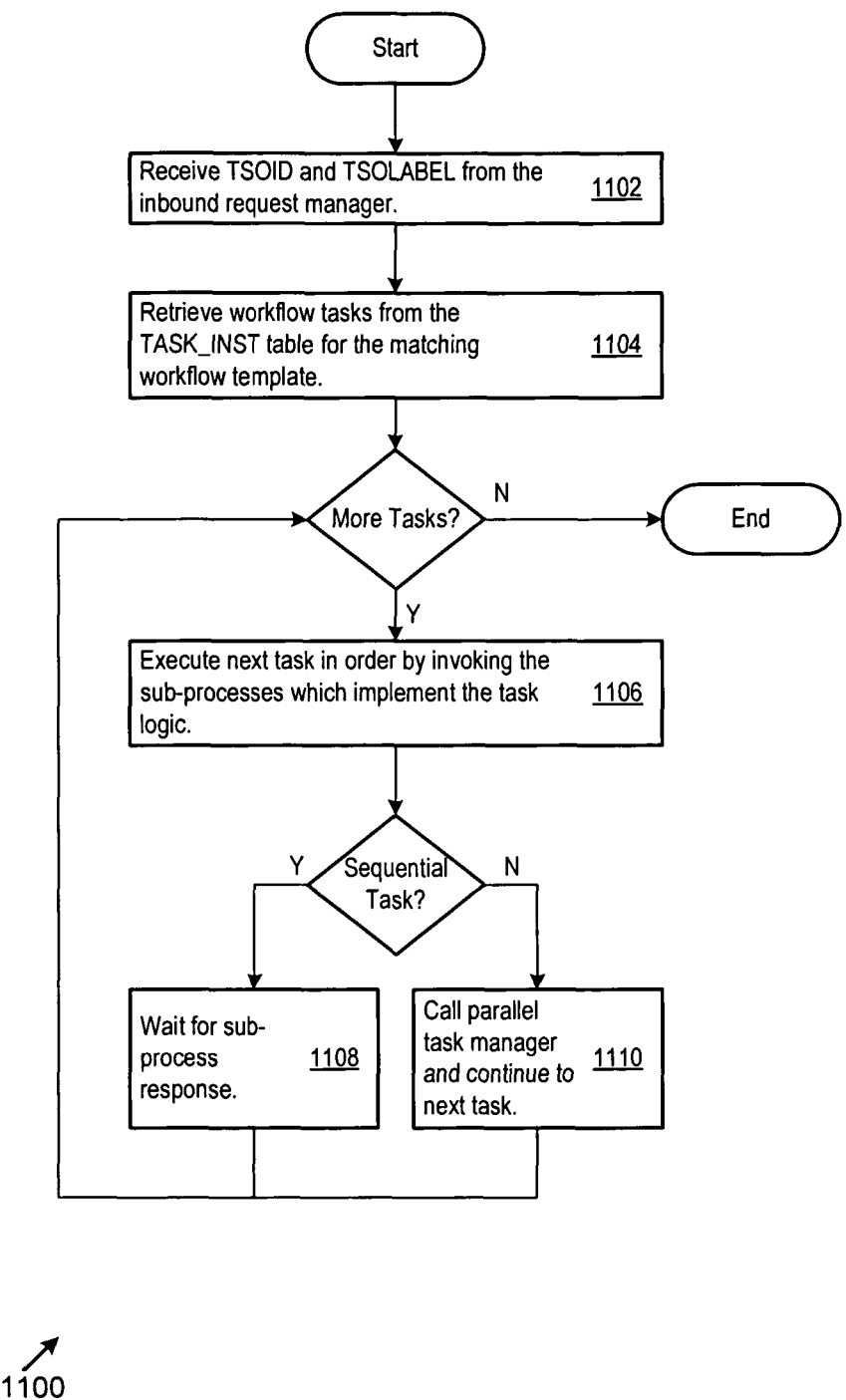
FIG. 11 shows the acts that a workflow engine may take to process a telecommunications service request.

FIG. 11 shows an example flow diagram of the actions 1100 taken by the workflow manager 310. The workflow manager 310 receives the TSO_ID and TSO_LABEL from the inbound request manager 308 (Act 1102). The workflow engine 310 then retrieves the workflow tasks within the workflow template from the TASK_INST table 808 (Act 1104).

If there are any more tasks in the workflow, the workflow engine 310 executes the next task in order (Act 1106). To do so, the workflow engine 310 invokes the sub-process identified for the task in the TASK_INST table 808. For tasks which are invoked sequentially, the workflow engine 310 invokes the task-sub-process and waits for a response from the sub-process (Act 1108). For tasks which may be invoked in parallel with other tasks, the workflow engine 310 invokes the task sub-process and continues on to the next task without waiting (Act 1110).

Several statuses are defined for the tasks. The workflow engine 304 and the web error GUI 314 may establish and maintain the statuses during execution of the tasks. The initial status for a task is 'I' (initial) and the end status may be either 'D' (done) or 'C' (forced completion). At the outset, each task may have a status set to 'I'. When the workflow engine 310 invokes the sub-process for executing the task, the task status changes to 'X' (execution). The 'X' status indicates that the sub-process is executing the task.

Successful completion of the task and receipt of a reply from the sub-process causes the task to transition to the 'D' (done) status. The workflow engine 310 in the workflow system 306 may then move to the next task in the workflow. If the sub-process replies with an error, the workflow engine 310 may set the task status to 'E' (error). In response, the workflow engine 310 passes the task to the web error GUI 314.

As noted above, the web error GUI 314 provides an interface through which an operator may correct the message content, skip the task, or resubmit the task (with corrections) for processing. When the task is resubmitted, the task status transitions to 'R' (resubmitted). The workflow system 306 receives the resubmitted task, executes the sub-process which handles the task, and sets the task status back to 'X'. For tasks with an error status 'E', the workflow engine 310 stops execution of the task. The web error GUI 314 may restart the task by publishing a request/reply message to the workflow system 306 to request processing the task.

If the web error GUI 314 skips the task, the task status is set to 'C' (completed). In addition, the operator may control executing tasks through the web error GUI 314. The operator may issue a request through the web error GUI 314 to force the task to immediately complete (transitioning the task to 'C' status), or may force the task to be resubmitted (transitioning the task to 'R' status). The workflow system 306 considers a 'C' status to be a final status, and in response moves on to the next task in the workflow sequence.

Figure 12:
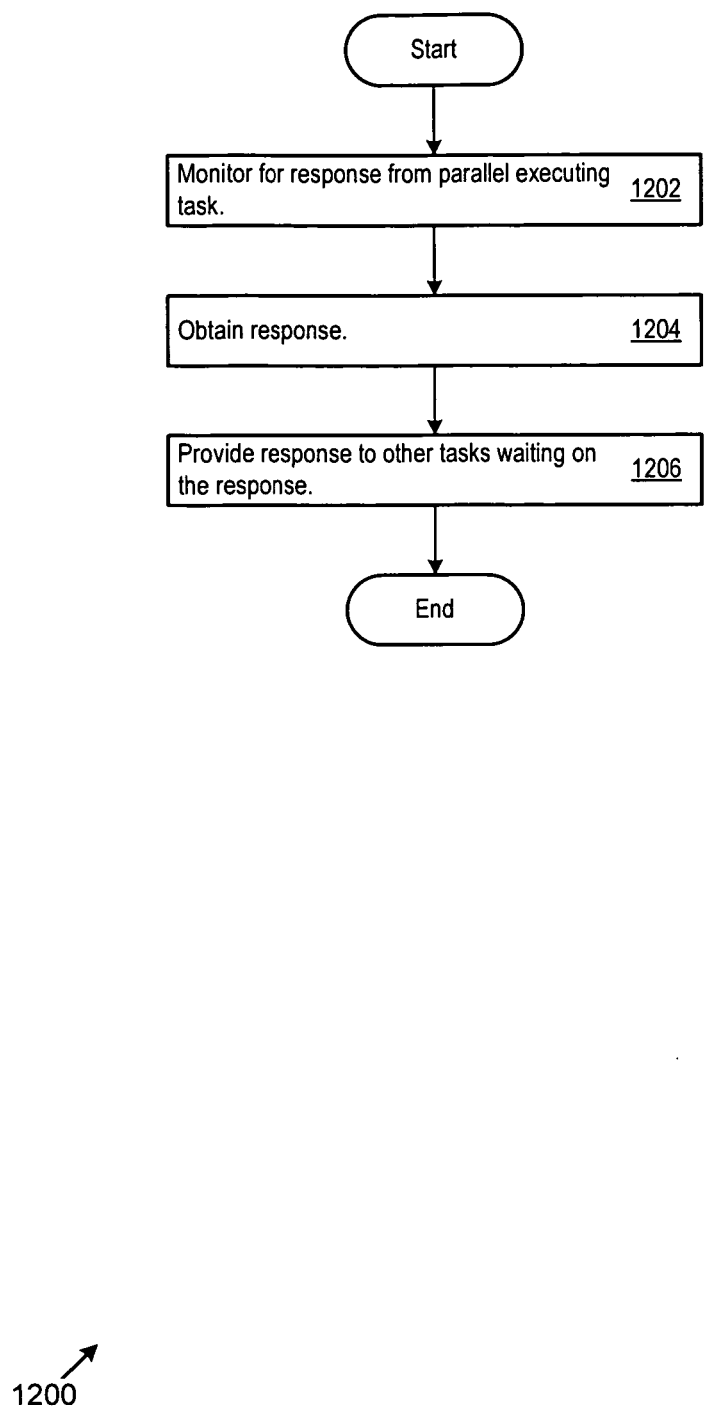
FIG. 12 shows the acts that a parallel tasks manager may take to process a telecommunications service request.

FIG. 12 shows an example of the acts 1200 taken by the parallel tasks manager 312. Certain tasks may be designated as parallel tasks which may run at the same time as other tasks. Nevertheless, some tasks may need results obtained by other tasks to proceed. Thus, the parallel tasks manager 312 monitors for a response from a sub-process executing a parallel task (Act 1202), obtains the response (Act 1204), and provides the response to other tasks (e.g., through the workflow engine 310) which await the response before they can continue (Act 1206). The parallel task manager 312 thereby acts to unblock tasks which are on hold, waiting for input data.

As noted above, the workflow system 306 also includes the action engine 318. The action engine 318 executes network provisioning actions within individual tasks. In other words, if the enhanced TOM database 316 specifies network provisioning actions for certain tasks, the second workflow system 306 may call the action engine 318 to process the actions.

The action engine 318 includes two layers: an action manager 320 and an action builder 322. The action manager 320 determines and initiates execution of the provisioning actions in the correct sequence as defined in the TOM database 316. The action builder 322 creates and sends the appropriate message to the message publication system 214 to request execution of the action, and also receives responses from the message publication system 214.

The action engine 318 executes in a manner similar to the workflow engine 310 (FIG. 11). More specifically, the action engine 318 receives a request for processing a task in a workflow. In response, the action manager 320 retrieves the actions to perform for the task from the ACTION_INST table 810.

For each action to be executed, the action manger 320 calls the action builder 322. If the action is not Detached (i.e., is not executed in parallel), then the action manager 320 waits for a response from the action builder 322. Otherwise, the action manager 320 initiates execution of the next action in the sequence without waiting for a response from the action builder 322. The web error GUI 314 may also manager errors which occur during execution of actions in the same manner and with the same status transitions as task errors.

The action builder 322 builds and sends action request messages to the message publication system 214 for delivery to the system or process which will execute the action. The action builder 322 receives responses arising from action execution from the message publication system 214. The action builder 322 passes the response back to the action manger 320. Depending on the response, the action manager 320 may handle any errors (e.g., through the web error GUI 314) or may execute the next network action, if any.

Workflows, tasks, and actions may be defined for a wide range of service requests. As one example, a workflow to activate a UMTS Subscriber Identity Module (USIM) may be associated with a TSO_LABEL of "ACTIVATE_USM" and may be divided into the following tasks: Activate the core basic service (providing, for example, the associated IMSI and MSISDN), Change the message service (e.g., to provide the MSISDN and customer name to associated messaging services), and Change the alerts service (e.g., to provide the customer name, birthdate, address, or other customer information to an alerting service). Additional examples of workflows associated with service requests from the CRM system 122 include workflows to Change a USIM, Suspend a USIM, Resume a USIM, Change an MSISDN number, Deactivate a handset, Pre-Activate pre-paid or post paid USIMs, Activate a service, Terminate a service, and Terminate a USIM.

The service broker 116 processes service requests for a wide variety of telecommunication services. In one role, the service broker 116 processes service requests received from the third party gateway 110. In general, the service broker 116 maps the inbound service request into a sequence of steps (e.g., tasks and actions) to take to implement the service request. The service broker 116 delivers a request for execution of each step to the appropriate system or process, determines the result, and communicates with the third party gateway 110 regarding the result.

Figure 13:
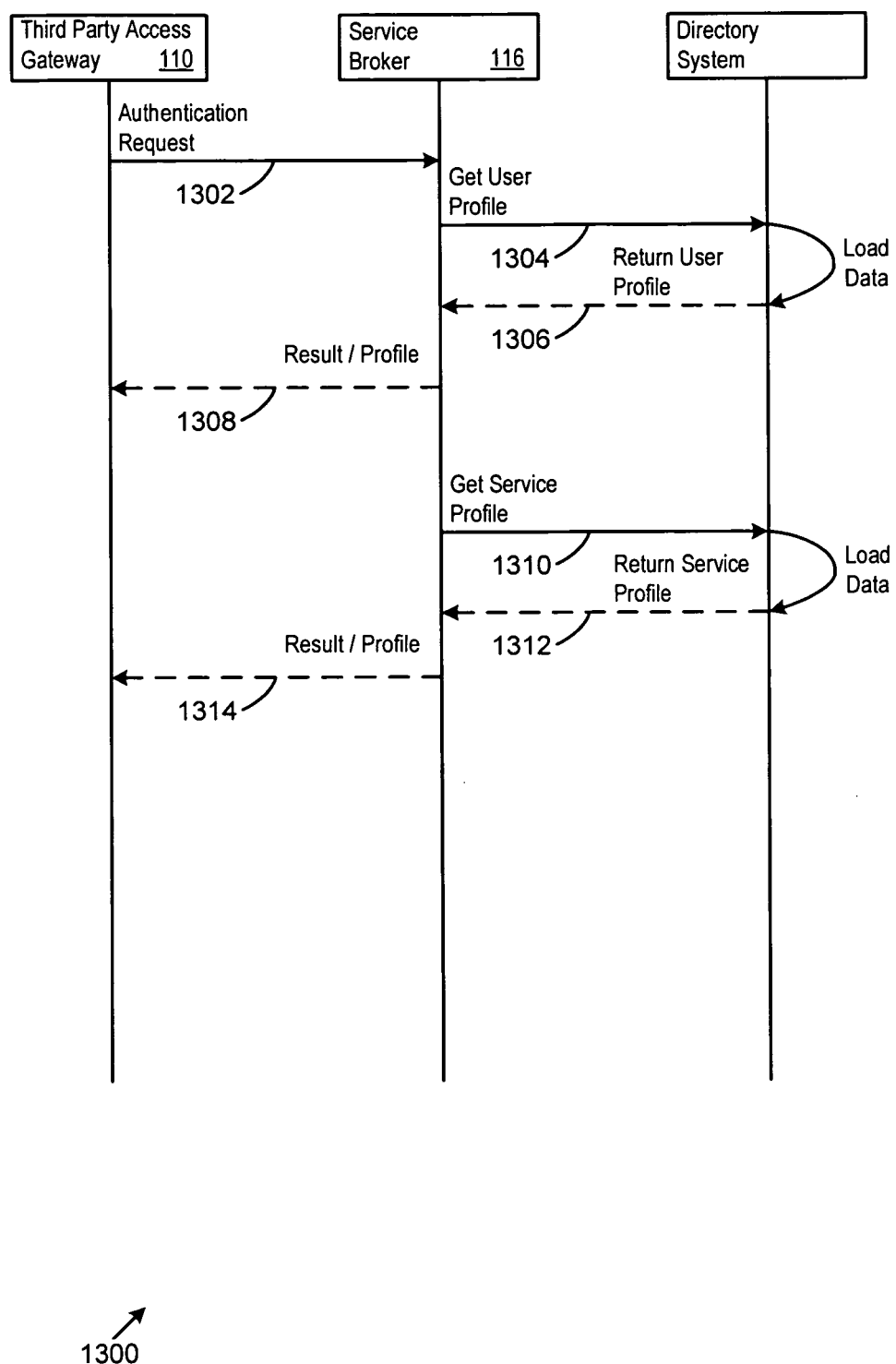
FIG. 13 illustrates a message flow through the service broker for processing an Authentication request.

FIG. 13 shows an example of the message flow resulting from an Authentication service request received from the third party gateway 110 (Flow 1302). The third party gateway 110 may send the Authentication request (including the information used to recognize the user, such as MSISDN and/or IMSI numbers) when, for example, a user needs to be identified before they can purchase a service. The service broker 116 submits a request for the user profile to a directory system (Flow 1304) which returns the user profile (Flow 1306).

The service broker 116 returns a result to the third party gateway 110 (Flow 1308). If the directory system was unable to authenticate the user, the service broker 116 returns a Not Authorized message to the third party gateway. Otherwise, the service broker 116 returns an Authorized message with user profile data. When the user is authorized, the service broker 116 may then request additional information about the user in the form of a request for the user service profile (Flow 1310) to the directory system, which returns the profile (Flow 1312).

The service broker 116 returns a result to the third party gateway 110 (Flow 1314). If the profile information was not available, the service broker 116 returns a Not Authorized message to the third party gateway 110. Otherwise, the service broker 116 returns an Authorized message with the service profile data.

Tables 22 and 23 show examples of the Authentication service request message and response.

TABLE 22

XML Input (Authentication)

```
<?xml version="1.0" encoding="ISO-8859-1" ?>
  <TSO_DATA >
  <TSOheader TSOID="12345"
  TSOlabel="USERSEAMLESSAUTHENTICATION"
/>
    <TSOattributes>
    <attribute name="IPADDRESS" value="10.212.32.43" />
    <attribute name="SERVICEID" value="55555" />
    <attribute name="PROVIDERID" value="88888" />
    </TSOattributes>
  </TSO_DATA>
```

TABLE 23

XML Output (Authentication)

```
<?xml version="1.0" encoding="ISO-8859-1" ?>
  <TSO_DATA>
  <TSOheader TSOID="12345"
  TSOlabel="USERSEAMLESSAUTHENTICATION"
/>
    <TSOattributes>
    <attribute name="ACCOUNTID" value="55555" />
    <attribute name="NETSTATUS" value="OK" />
    <attribute name="LOCATION" value="xxx" />
    <attribute name="TYPEOFACCESS" value="MEGA" />
    <attribute name="SERVICESTATUS" value="OK" />
    <attribute name="SERVICEDATA" value="test@testnet.com" />
    </TSOattributes>
    <TSOresult>
      <statusCode>0</statusCode>
      <errorCode></errorCode>
      <errorDescription></errorDescription>
    </TSOresult>
  </TSO_DATA>
```

Figure 14:
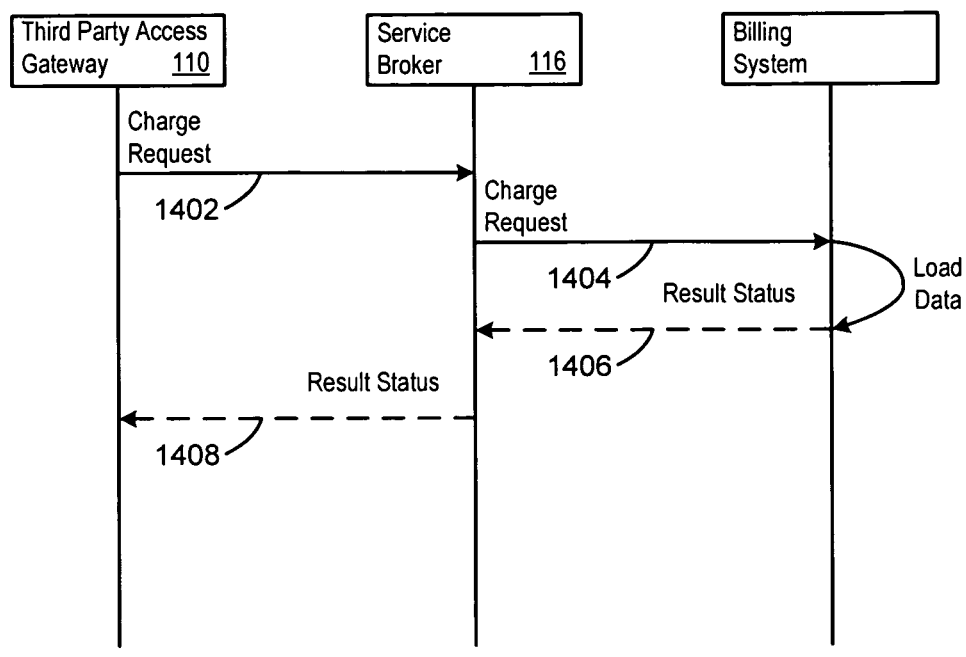
FIG. 14 illustrates a message flow through the service broker for processing a Charge request.

FIG. 14 shows an example of the message flow resulting from a Charge service request received from the third party gateway 110 (Flow 1402). The third party gateway 110 may send the Charge request to charge a service amount to a user account. The service broker 116 submits the charge request to the billing system, including the charge amount (Flow 1404). The billing system charges the service to the account and returns a result status to the service broker 116 (Flow 1406).

The service broker 116 returns the result status to the third party gateway 110 (Flow 1408).

Tables 24 and 25 show examples of the Charge service request message and response.

TABLE 24

XML Input (Charge)

```
<?xml version="1.0" encoding="ISO-8859-1" ?>
  <TSO_DATA >
    <TSOheader TSOID="12345" TSOlabel="CHARGESERVICE" />
    <TSOattributes>
      <attribute name="SERVICEID" value="55555" />
      <attribute name="STARTDATE" value="05/05/2004" />
      <attribute name="ENDDATE" value="10/05/2004" />
      <attribute name="ACCOUNTID" value="77777" />
    </TSOattributes>
  </TSO_DATA>
```

TABLE 25

XML Output (Charge)

```
<?xml version="1.0" encoding="ISO-8859-1" ?>
  <TSO_DATA>
    <TSOheader TSOID="12345" TSOlabel="CHARGESERVICE" />
    <TSOresult>
      <statusCode>0</statusCode>
      <errorCode></errorCode>
      <errorDescription></errorDescription>
    </TSOresult>
  </TSO_DATA>
```

Figure 15:
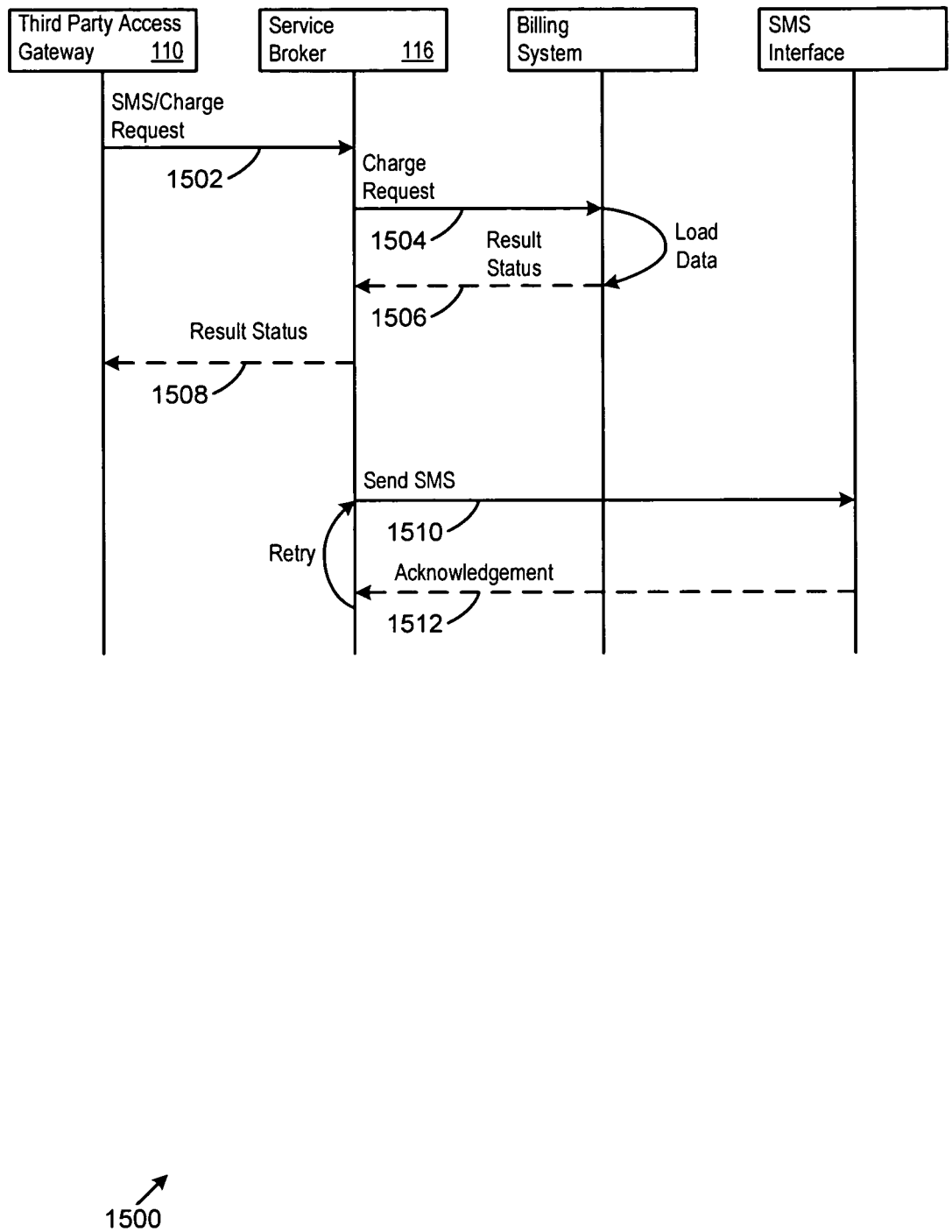
FIG. 15 illustrates a message flow through the service broker for processing an SMS delivery and charge request.

FIG. 15 shows an example of the message flow resulting from an SMS delivery service request received from the third party gateway 110 (Flow 1502). The third party gateway 110 may send the SMS request to charge and deliver an SMS message for a user account. The service broker 116 requests the billing system to charge the account for the service (Flow 1504) and receives a result status from the billing system (Flow 1506). The service broker 116 returns the result status to the third party gateway 110 (Flow 1508). The service broker 116 then calls the SMS process or system through the network interface to send the SMS (Flow 1510) and receives an acknowledgement (Flow 1512). The service broker 116 may continue to retry to send the SMS message in the event of errors.

Tables 26 and 27 show examples of the SMS service request message and response.

TABLE 26

XML Input (SMS)

```
<?xml version="1.0" encoding="ISO-8859-1" ?>
  <TSO_DATA>
    <TSOheader TSOID="12345" TSOlabel="SMSDELIVERY" />
    <TSOattributes>
      <attribute name="SERVICE_TYPE" value="SMS" />
      <attribute name="SENDERADDRESS" value="M-Site" />
      <attribute name="SERVICEID" value="55555" />
      <attribute name="STARTDATE" value="05/05/2004" />
      <attribute name="ENDDATE" value="10/05/2004" />
      <attribute name="PRIORITY" value="High" />
      <attribute name="SUBJECT" value="Message" />
      <attribute name="ACCOUNTID" value="77777" />
      <attribute name="MESSAGE_BODY" value="Message Body" />
      <list name="TO_ADDRESSEE" value="3">
        <attribute name="1" value="+39xxxx" />
        <attribute name="2" value="+39xxxx" />
        <attribute name="3" value="+39xxxx" />
      </list>
```

TABLE 26-continued

XML Input (SMS)

```
      <list name="CC_ADDRESSEE" value="4">
        <attribute name="1" value="+39xxxx" />
        <attribute name="2" value="+39xxxx" />
        <attribute name="3" value="+39xxxx" />
        <attribute name="4" value="+39xxxx" />
      </list>
      <list name="BCC_ADDRESSEE" value="3">
        <attribute name="1" value="+39xxxx" />
        <attribute name="2" value="+39xxxx" />
        <attribute name="3" value="+39xxxx" />
      </list>
    </TSOattributes>
  </TSO_DATA>
```

TABLE 27

XML Output (SMS)

```
<?xml version="1.0" encoding="ISO-8859-1" ?>
  <TSO_DATA >
    <TSOheader TSOID="12345" TSOlabel="SMSDELIVERY" />
    <TSOresult>
      <statusCode>0</statusCode>
      <errorCode></errorCode>
      <errorDescription></errorDescription>
    </TSOresult>
  </TSO_DATA>
```

Figure 16:
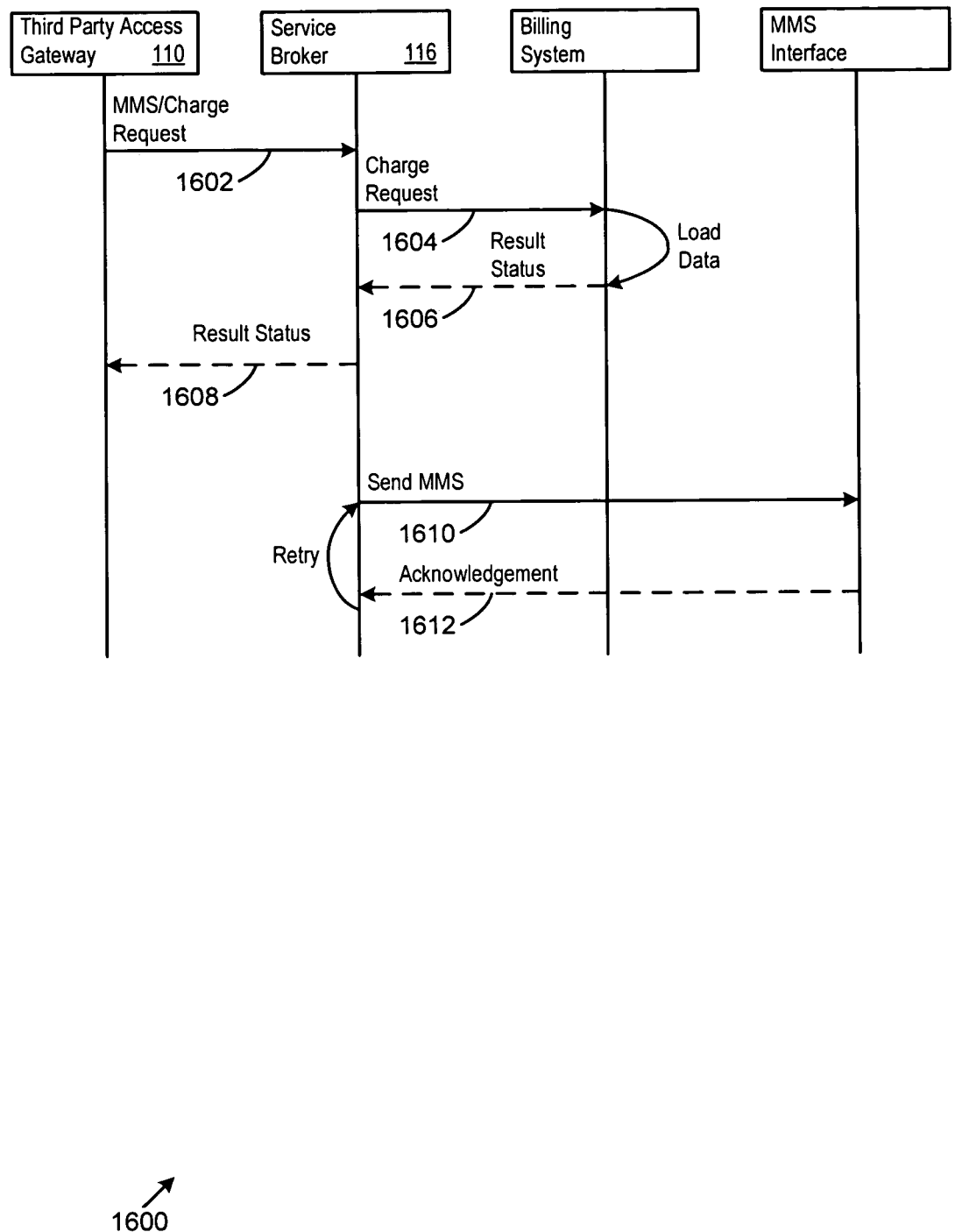
FIG. 16 illustrates a message flow through the service broker for processing an MMS delivery and charge request.

FIG. 16 shows an example of the message flow resulting from an MMS delivery service request received from the third party gateway 110 (Flow 1602). The third party gateway 110 may send the MMS request to charge and deliver an MMS message for a user account. The service broker 116 requests the billing system to charge the account for the service (Flow 1604) and receives a result status from the billing system (Flow 1606). The service broker 116 returns the result status to the third party gateway 110 (Flow 1608). The service broker 116 then calls the MMS process or system through the network interface to send the MMS (Flow 1610) and receives an acknowledgement (Flow 1612). The service broker 116 may continue to retry to send the MMS message in the event of errors.

Tables 28 and 29 show examples of the MMS service request message and response.

TABLE 28

XML Input (MMS)

```
<?xml version="1.0" encoding="ISO-8859-1" ?>
  <TSO_DATA>
    <TSOheader TSOID="12345" TSOlabel="MMSDELIVERY" />
    <TSOattributes>
      <attribute name="SERVICE_TYPE" value="MMS" />
      <attribute name="SENDERADDRESS" value="M-Site" />
      <attribute name="SERVICEID" value="55555" />
      <attribute name="STARTDATE" value="05/05/2004" />
      <attribute name="ENDDATE" value="10/05/2004" />
      <attribute name="PRIORITY" value="High" />
      <attribute name="SUBJECT" value="Message" />
      <attribute name="ACCOUNTID" value="77777" />
      <attribute name="MESSAGE_BODY" value="Message Body" />
      <list name="TO_ADDRESSEE" value="3">
        <attribute name="1" value="+39xxxx" />
        <attribute name="2" value="+39xxxx" />
        <attribute name="3" value="+39xxxx" />
      </list>
```

TABLE 28-continued

XML Input (MMS)

```
    <list name="CC_ADDRESSEE" value="4">
        <attribute name="1" value="+39xxxx" />
        <attribute name="2" value="+39xxxx" />
        <attribute name="3" value="+39xxxx" />
        <attribute name="4" value="+39xxxx" />
    </list>
    <list name="BCC_ADDRESSEE" value="3">
        <attribute name="1" value="+39xxxx" />
        <attribute name="2" value="+39xxxx" />
        <attribute name="3" value="+39xxxx" />
    </list>
    </TSOattributes>
</TSO_DATA>
```

TABLE 29

XML Output (MMS)

```
<?xml version="1.0" encoding="ISO-8859-1" ?>
    <TSO_DATA>
        <TSOheader TSOID="12345" TSOlabel="MMSDELIVERY" />
        <TSOresult>
            <statusCode>0</statusCode>
            <errorCode></errorCode>
            <errorDescription></errorDescription>
        </TSOresult>
    </TSO_DATA>
```

Figure 17:
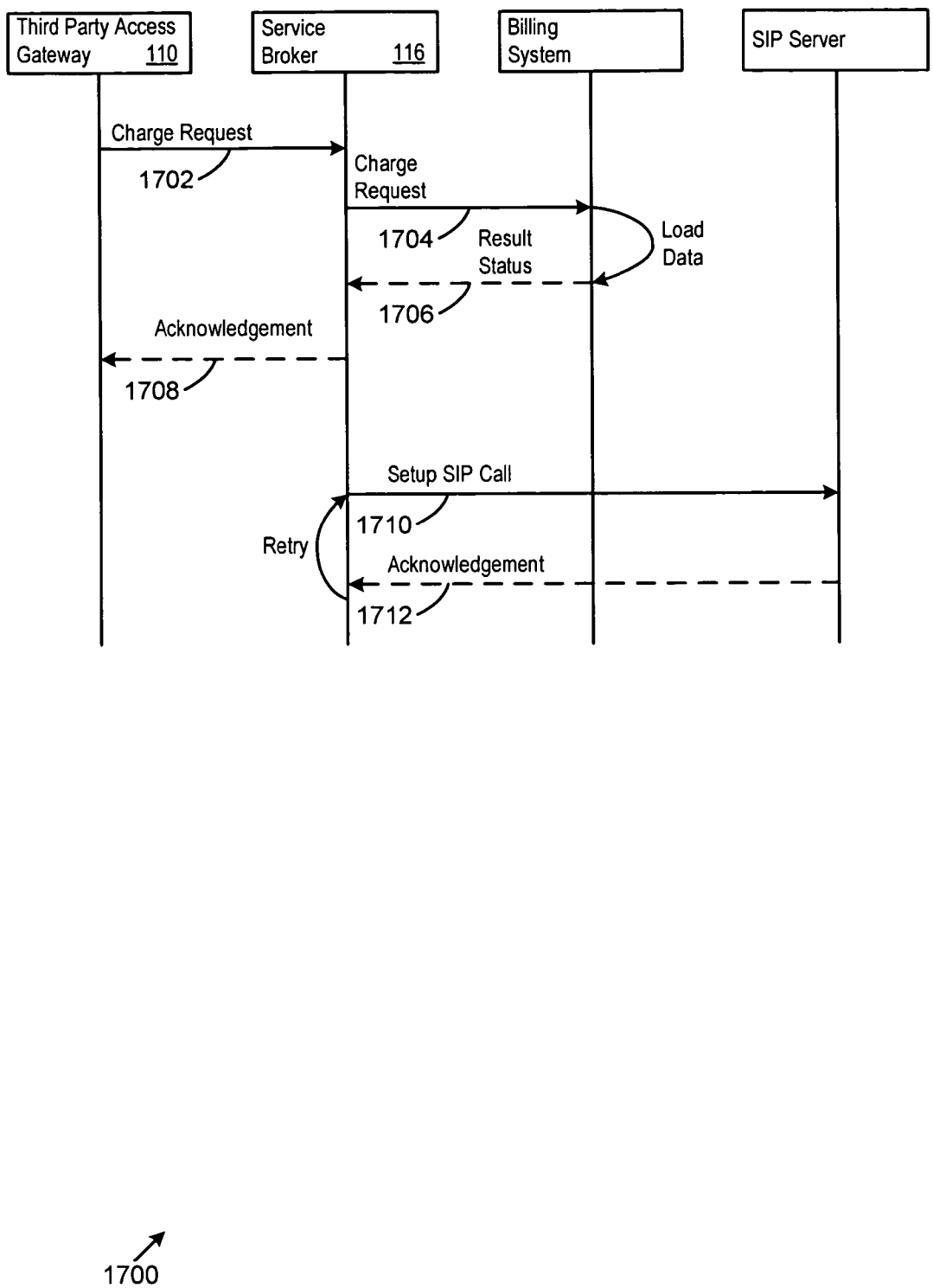
FIG. 17 illustrates a message flow through the service broker for processing an SIP call request.

FIG. 17 shows an example of the message flow resulting from a Session Initiation Protocol (SIP) service request received from the third party gateway 110 (Flow 1702). The third party gateway 110 may send the SIP request to set-up a SIP call and charge a user account. The service broker 116 requests the billing system to charge the account for the service (Flow 1704) and receives a result status from the billing system (Flow 1706). The service broker 116 returns the result status to the third party gateway 110 (Flow 1708). The service broker 116 then calls the SIP process or system through the network interface to set-up the SIP connection (Flow 1710) and receives an acknowledgement (Flow 1712). The service broker 116 may continue to retry to set-up the SIP connection in the event of errors.

Tables 30 and 31 show examples of the SIP service request message and response.

TABLE 30

XML Input (SIP)

```
<?xml version="1.0" encoding="ISO-8859-1" ?>
    <TSO_DATA >
    <TSOheader TSOID="12345" TSOlabel="SIPCALL" />
        <TSOattributes>
        <attribute name="SERVICEID" value="55555" />
        <attribute name="STARTDATE" value="05/05/2004" />
        <attribute name="ENDDATE" value="10/05/2004" />
        <attribute name="ACCOUNTID" value="77777" />
        <attribute name="SENDERURI" value="http://10.212.23.30" />
        <attribute name="RECEIVERURI" value="http://12.234.45.23" />
        </TSOattributes>
</TSO_DATA>
```

TABLE 31

XML Output (SIP)

```
<?xml version="1.0" encoding="ISO-8859-1" ?>
    <TSO_DATA>
        <TSOheader TSOID="12345" TSOlabel="SIPCALL" />
        <TSOresult>
            <statusCode>0</statusCode>
            <errorCode></errorCode>
            <errorDescription></errorDescription>
        </TSOresult>
    </TSO_DATA>
```

Figure 18:
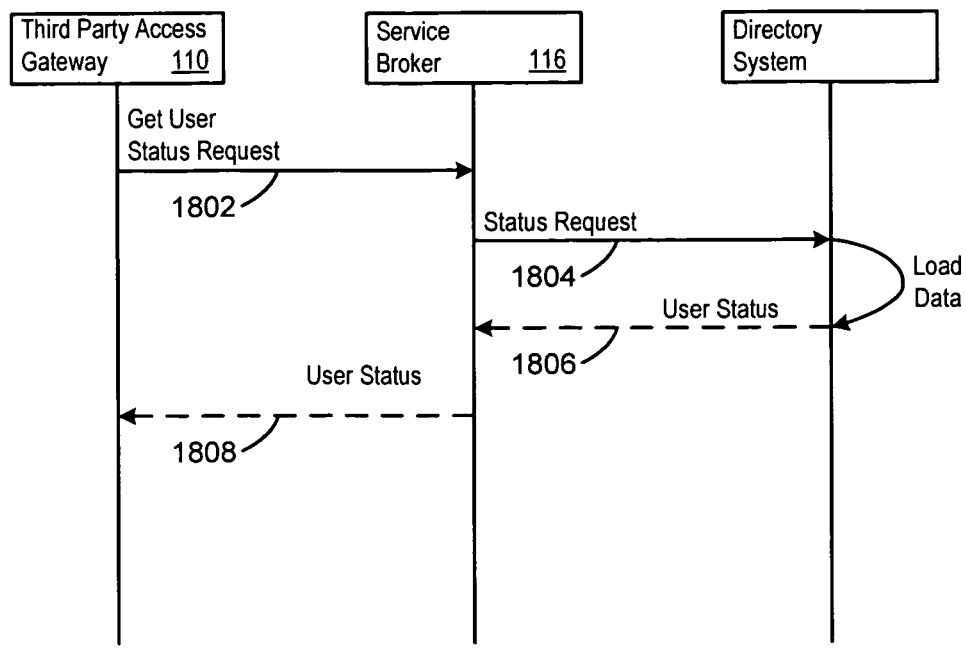
FIG. 18 illustrates a message flow through the service broker for processing a user Status request.

FIG. 18 shows an example of the message flow resulting from a User Status service request received from the third party gateway 110 (Flow 1802). The third party gateway 110 may send the Status request to perform an on-line presence check of other users. The service broker 116 sends a status request message to a directory system (Flow 1804) which returns the user status (Flow 1806). The service broker 116 returns the user status to the third party gateway (Flow 1808).

Tables 32 and 33 show examples of the Status service request message and response.

TABLE 32

XML Input (Status)

```
<?xml version="1.0" encoding="ISO-8859-1" ?>
    <TSO_DATA>
        <TSOheader TSOID="12345" TSOlabel="GETUSERSSTATUS" />
        <TSOattributes>
        <attribute name="CATEGORYID" value="" />
        <attribute name="USERID" value="test.user@testemail" />
        <attribute name="SERVICEID" value="acc00143423001" />
        </TSOattributes>
    </TSO_DATA>
```

TABLE 33

XML Output (Status)

```
<?xml version="1.0" encoding="ISO-8859-1" ?>
    <TSO_DATA>
        <TSOheader TSOID="12345" TSOlabel="GETUSERSSTATUS" />
        <TSOattributes>
        <list name="USERSID" value="3">
            <attribute name="1" value="test.user@testmail" />
        </list>
        <list name="USERSSTATUS" value="3">
            <attribute name="1" value="ONLINE" />
        </list>
        </TSOattributes>
        <TSOresult>
            <statusCode>0</statusCode>
            <errorCode></errorCode>
            <errorDescription></errorDescription>
        </TSOresult>
    </TSO_DATA>
```

Figure 19:
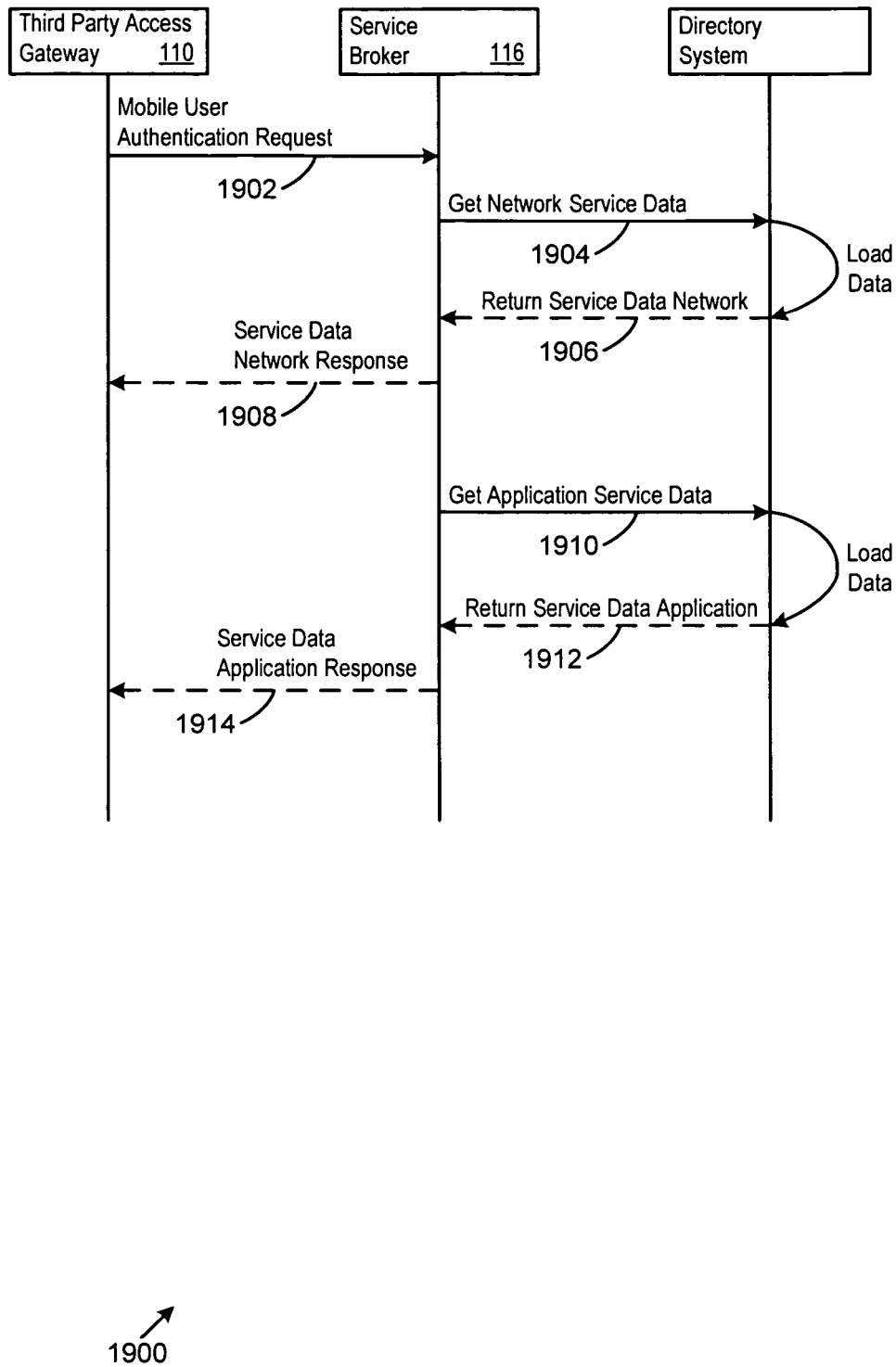
FIG. 19 illustrates a message flow through the service broker for processing a mobile user Authentication request.

FIG. 19 shows an example of the message flow resulting from a Mobile User Status authentication service request received from the third party gateway 110 (Flow 1902). The third party gateway 110 may send the Authentication request (including the information used to recognize the user, such as MSISDN and/or IMSI numbers) when, for example, a user needs to be identified before they can purchase a service such as Internet Protocol Television (IPTV) service. The service broker 116 submits a request for the user service data (e.g., network characteristics for the user) to a directory system (Flow 1904) which returns the user service data (Flow 1906). The service broker 116 returns a result to the third party gateway 110 (Flow 1908). If the directory system was unable to authenticate the user, the service broker 116 returns a Not Authorized message to the third party gateway. Otherwise, the service broker 116 returns an Authorized message with user service data. When the user is authorized, the service broker 116 may then request additional information about the user in the form of a request for the user application service profile (Flow 1910) to the directory system, which returns the profile (Flow 1912).

The service broker 116 returns a result to the third party gateway 110 (Flow 1914). If the application service information was not available, the service broker 116 returns a Not Authorized message to the third party gateway 110. Otherwise, the service broker 116 returns an Authorized message with the application service data.

Tables 34 and 35 show examples of the mobile user authentication service request message and response.

TABLE 34

XML Input (Mobile Authentication)

<?xml version="1.0" encoding="ISO-8859-1" ?>
  <TSO_DATA>
    <TSOheader TSOID="12345"
TSOlabel="GETAPPLICATIONSERVICEDATA" />
    <TSOattributes>
      <attribute name="MSISDN" value="3473626805" />
      <attribute name="SERVICEID" value="acc001005001" />
    </TSOattributes>
  </TSO_DATA>

TABLE 35

XML Output (Mobile Authenticaion)

<?xml version="1.0" encoding="ISO-8859-1" ?>
  <TSO_DATA>
    <TSOheader TSOID="12345"
TSOlabel="GETAPPLICATIONSERVICEDATA" />
    <TSOattributes>
      <attribute name="SERVICESTATUS" value="OK" />
  <list name="SERVICETECHNICALPROFILE">
      <attribute name="COUNTRYCODE" value="0039" />
      <attribute name="ROAMINGSTATUS" value="Status" />
      <attribute name="ACCESSCHANNEL" value="Pluto" />
      <attribute name="ROAMINGPARTNER" value="H3G" />
      <attribute name="CUSTOMERTYPE" value="Type" />
      <attribute name="PLANID" value="ID" />
      <attribute name="SIMTYPE" value="PREPAID" />
      <attribute name="TERMINALMODE" value="DUAL" />
      <attribute name="MMSSTATUS" value="OK" />
      <attribute name="UMTSSTATUS" value="OK" />
      <attribute name="GPRSSTATUS" value="OK" />
  </list>
    </TSOattributes>
  </TSO_DATA>

Figure 20:
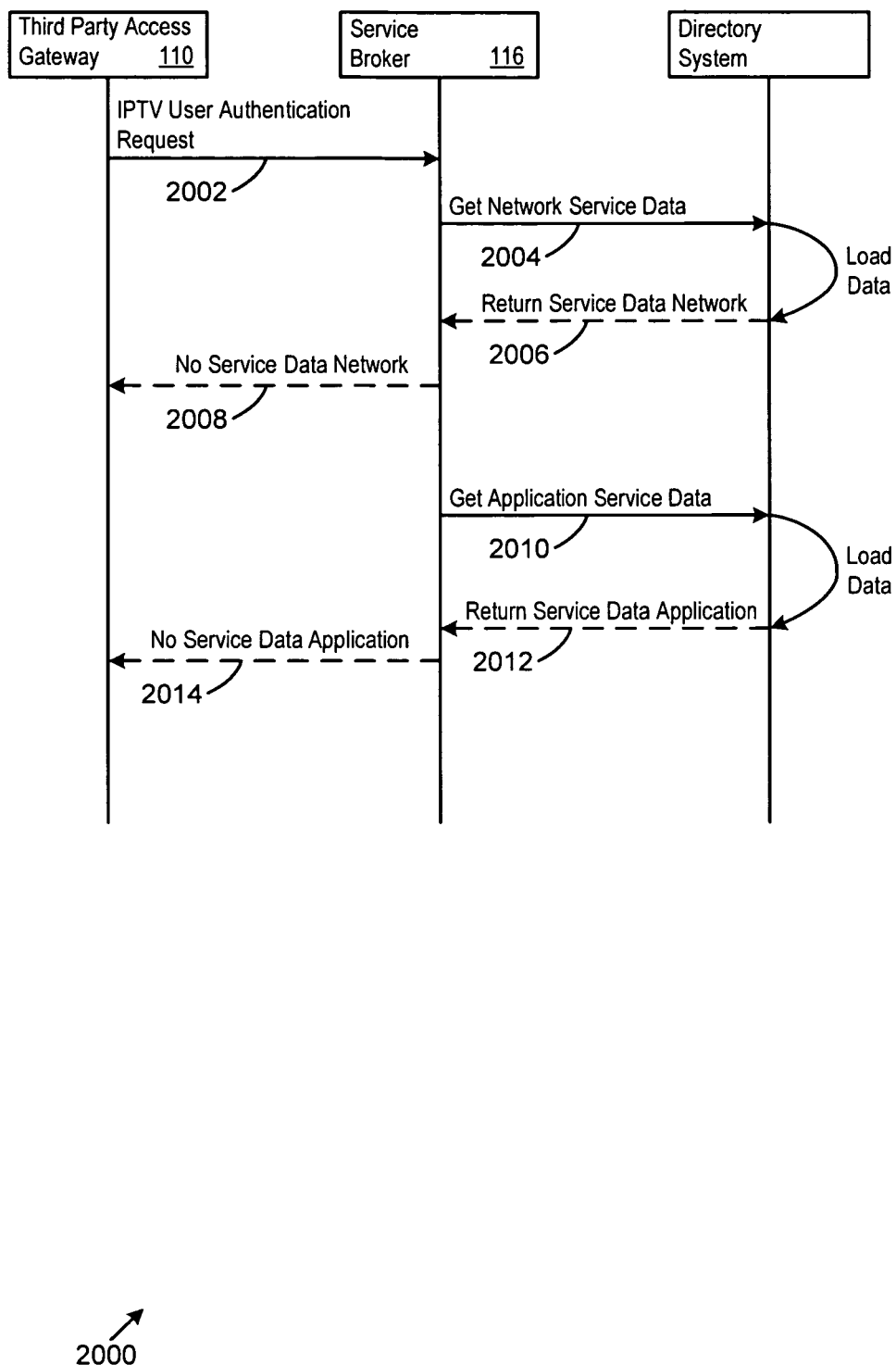
FIG. 20 illustrates a message flow through the service broker for processing an IPTV user Authentication request.

FIG. 20 shows an example of the message flow resulting from an IPTV user authentication request received from the third party gateway 110 (Flow 2002). The third party gateway 110 may send the Authentication request (including the information used to recognize the user, such as MSISDN and/or IMSI numbers, and allow the user to use the service) when, for example, a user tries to connect to a mobile IPTV application. The service broker 116 submits a request for the user service data (e.g., network characteristics for the user) to a directory system (Flow 2004) which returns the user service data (Flow 2006).

The service broker 116 returns a result to the third party gateway 110 (Flow 2008). If the directory system was unable to authenticate the user, the service broker 116 returns a Not Authorized message to the third party gateway. Otherwise, the service broker 116 returns an Authorized message with user service data. When the user is authorized, the service broker 116 may then request additional information about the user in the form of a request for the user application service profile (Flow 2010) to the directory system, which returns the profile (Flow 2012).

The service broker 116 returns a result to the third party gateway 110 (Flow 2014). If the application service information was not available, the service broker 116 returns a Not Authorized message to the third party gateway 110. Otherwise, the service broker 116 returns an Authorized message with the application service data.

Tables 36 and 37 show examples of the IPTV user authentication service request message and response.

TABLE 36

XML Input (IPTV Authentication)

<?xml version="1.0" encoding="ISO-8859-1" ?>
  <TSO_DATA>
    <TSOheader TSOID="12345"
TSOlabel="GETAPPLICATIONSERVICEDATA" />
    <TSOattributes>
      <attribute name="IPADDRESS" value="80.117.120.203" />
      <attribute name="SERVICEID" value="acc001004001" />
    </TSOattributes>
  </TSO_DATA>

TABLE 37

XML Output (IPTV Authenticaion)

<?xml version="1.0" encoding="ISO-8859-1" ?>
  <TSO_DATA>
    <TSOheader TSOID="12345"
    TSOlabel="GETAPPLICATIONSERVICEDATA"
/>
    <TSOattributes>
      <attribute name="SERVICESTATUS" value="OK" />
  <list name="SERVICETECHNICALPROFILE">
      <attribute name="ACCOUNTID" value="03403432" />
      <attribute name="ACCFIRSTNAME" value="Name" />
      <attribute name="ACCLASTNAME value="Name" />
      <attribute name="ACCBILLCITY" value="City" />
      <attribute name="ACCBILLADDRESS1" value="Address" />
      <attribute name="ACCBILLREGION" value="Region" />
        <attribute name="ACCBILLPOSTALCODE" value="000100" />
        <attribute name="ACCBILLCOUNTRY" value="Country" />
  </list>
    </TSOattributes>
  </TSO_DATA>

All of the discussion above, regardless of the particular implementation being described, is exemplars in nature, rather than limiting. For example, although selected aspects, features, or components of the implementations are depicted as being stored in memories, all or part of systems and methods consistent with the service broker may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the service broker architecture are described, methods, systems, and articles of manufacture consistent with the service broker architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Systems may be implemented in hardware, software, or a combination of hardware and software in one processing system or distributed across multiple processing systems.

The service broker layer overcomes the technical challenges associated with processing external service requests. The distribution of service requests in queues addresses the technical challenge of receiving and organizing an enormous number of simultaneous or nearly simultaneous service requests. The multiple fetcher and workflow engine architecture address the technical challenge in extracting the service requests in an organized and efficient manner, executing the extracted service requests to actually accomplish the requested processing, providing fault tolerant service request processing, and maximizing performance of service request processing.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A service request processing system for a telecommunications architecture, the service request processing system comprising a memory for providing:
   a service request interface which receives service requests for telecommunications services, each service request comprising a service type identifier field and a service request identifier field;
   a dispatcher system which distributes the service requests into different service request queues in memory on the basis of the service type identifier field, thereby establishing queued service request records in the memory;
   traffic control parameters that govern selection, by a fetcher system, of the queued service request records from the different service request queues in the memory,
   wherein the fetcher system obtains, from the different service request queues in the memory under control of the traffic control parameters, selected service request identifiers from the service request identifier fields of the queued service request records; and
   a workflow system which initiates workflow sequences which fulfill the service requests identified by the selected service request identifiers, wherein the workflow system retrieves service request definitions from input message fields in the queued service request records that correspond to the selected service request identifiers, performs workflow steps according to the service request definitions, and writes workflow results back into message output fields in the queued service request records that correspond to the selected service request identifiers.

2. The service request processing system of claim 1, where the different service request queues comprise:
   customer relationship management service request queues; and
   third party service request queues.

3. The service request processing system of claim 2, where the third party service request queues comprise:
   a message service request queue; and
   a charge service request queue.

4. The service request processing system of claim 3, where the message service request queue comprises a short messaging service (SMS) request queue.

5. The service request processing system of claim 3, where the message service request queue comprises a multimedia messaging service (MMS) request queue.

6. The service request processing system of claim 2, where the third party service request queues comprise:
   an authentication request queue; and
   a status request queue.

7. The service request processing system of claim 6, where the authentication request queue comprises a mobile user authentication request queue.

8. The service request processing system of claim 2, where the customer relationship management service request queues comprise:
   an activate service request queue; and
   a terminate service request queue.

9. A method for processing telecommunication service requests, the method comprising:
   receiving service requests for telecommunications services, each service request comprising a service type identifier field and a service request identifier field;
   dispatching the service requests into different service request queues in memory on the basis of the service type identifier field, thereby establishing queued service request records in the memory;
   establishing traffic control parameters which govern selection, by a fetcher system, of the queued service request records from the different service request queues in the memory;
   initiating execution of the fetcher system to obtain, from the different service request records under control of the traffic control parameters, selected service request identifiers from the service request identifier fields of the queued service request records;
   retrieving service request definitions from input message fields in the queued service request records that correspond to the selected service request identifiers;
   performing workflow steps according to the service request definitions;
   performing workflow steps identified by the selected service request identifiers; and
   writing workflow processing results into message output fields in the queued service request records that correspond to the selected service request identifiers.

10. The method of claim 9, where initiating execution of a fetcher system comprises:
    initiating execution of a first fetcher system;
    initiating execution of a second fetcher system; and
    where performing workflow steps comprises:
    communicating a first one of the selected service request identifiers to a first workflow engine for the first fetcher system; and
    communicating a second one of the selected service request identifiers to a second workflow engine for the second fetcher system.

11. The method of claim 9, where dispatching comprises:
    dispatching the service requests between:
    customer relationship management service request queues; and
    third party service request queues.

12. The method of claim 11, where the third party service request queues comprise a message service request queue.

13. The method of claim 12, where the message service request queue comprises a short messaging service (SMS) request queue.

14. The method of claim 12, where the message service request queue comprises a multimedia messaging service (MMS) request queue.

15. The method of claim 11, where the third party service request queues comprise:

an authentication request queue; and a status request queue.

16. The method of claim 15, where the authentication request queue comprises a mobile user authentication request queue.

17. The method of claim 9, where the different service request queues comprise database queue tables.

18. The method of claim 17, where the database queue tables comprise a 'Process Status' field which indicates whether a queue entry has been fetched.

19. The method of claim 18, where the database queue tables comprise a 'Process Completed' field which indicates whether processing of the queue entry has completed.

20. The service request processing system of claim 1, wherein the fetcher system is one of multiple independent fetcher systems and the workflow system is one of multiple independent workflow systems, each of which retrieves service request definitions from input message fields in the queued service request records that correspond to the selected service request identifiers, performs workflow steps according to the service request definitions, and writes workflow results back into message output fields in the queued service request records that correspond to the selected service request identifiers.

* * * * *